MAGNETIC RECORDING AND PLAYBACK APPARATUS FOR ANALYTICAL SIGNALS

Filed Feb. 28, 1966 8 Sheets-Sheet 1

BURNEY J. EHRLICH
DAVID W. SPENCE INVENTORS
CLINTON D. FRISBY
BY Hayden & Pravel BURNEY J. EHRLICH
DAVID W. SPENCE INVENTORS
CLINTON D. FRISBY
BY Hayden & Pravel

MAGNETIC RECORDING AND PLAYBACK APPARATUS FOR ANALYTICAL SIGNALS

Filed Feb. 28, 1966 8 Sheets-Sheet 3

BURNEY J. EHRLICH
DAVID W. SPENCE INVENTORS
CLINTON D. FRISBY
BY Hayden & Pravel Oct. 28, 1969 B. J. EHRLICH ETAL 3,475,740

MAGNETIC RECORDING AND PLAYBACK APPARATUS FOR ANALYTICAL SIGNALS

Filed Feb. 28, 1966 8 Sheets-Sheet 4

BURNEY J. EHRLICH
DAVID W. SPENCE INVENTORS
CLINTON D. FRISBY
BY Hayden & Pravel BURNEY J. EHRLICH
DAVID W. SPENCE INVENTORS
CLINTON D. FRISBY
BY Hayden & Pravel BURNEY J. EHRLICH
DAVID W. SPENCE INVENTORS
CLINTON D. FRISBY
BY Hayden & Pravel

MAGNETIC RECORDING AND PLAYBACK APPARATUS FOR ANALYTICAL SIGNALS

Filed Feb. 28, 1966 8 Sheets-Sheet 7

BURNEY J. EHRLICH
DAVID W. SPENCE
CLINTON D. FRISBY
INVENTORS

BY Hayden & Pravel

BURNEY J. EHRLICH
DAVID W. SPENCE INVENTOR.
CLINTON D. FRISBY
BY Hayden & Pravel United States Patent Office 3,475,740

Patented Oct. 28, 1969

3,475,740

MAGNETIC RECORDING AND PLAYBACK APPARATUS FOR ANALYTICAL SIGNALS

Burney J. Ehrlich, David W. Spence, and Clinton D. Frisby, Houston, Tex., assignors to Infotronics Corporation, a corporation of Texas Filed Feb. 28, 1966, Ser. No. 530,282
Int. Cl. H03k *13/02*; G11b *5/00, 5/86*
U.S. Cl. 340—174.1 18 Claims

ABSTRACT OF THE DISCLOSURE

In the recording apparatus, an analytical signal from an analytical measuring instrument and a direct-current offset signal are supplied to a voltage-to-frequency converter to produce a pulsating data signal having a repetition rate proportional to the sum of the amplitudes of these signals. The pulsating data signal and a pulsating reference signal having a constant repetition rate are simultaneously recorded in separate tracks on a magnetic recording tape. In the playback apparatus, the recorded data and reference signals are separately reproduced and supplied to separate frequency-to-voltage converters for converting the reproduced data signal into a reconstructed analytical signal and for converting the reproduced reference signal into a direct-current signal. The direct-current signal is subtracted from the reconstructed analytical signal and the resultant analytical signal is supplied to integrator apparatus for determining the areas under the data fluctuations in such analytical signal. The integrator apparatus includes a voltage-to-frequency converter for converting the resultant analytical signal into a train of pulses having a repetition rate proportional to the amplitude of such resultant signal. The integrator apparatus further includes a pulse counter for counting the pulses occurring during the different data fluctuations and for providing digital signals to a printer representing the areas under the individual fluctuations. The recording apparatus further includes an adjustable gain amplifier for adjusting the amplification of the analytical signal before it is applied to the voltage-to-frequency converter in the recording apparatus, together with means for modifying the waveform of the pulsating reference signal to provide an indication of the amplifier gain setting. The playback apparatus further includes means responsive to the character of the reproduced reference signal waveform for developing a control signal which controls the counter stage to which the integrator pulses are applied such that the overall scale factor of the system remains unchanged.

This invention relates to a means for recording signals of long time duration with high fidelity, and also relates to playback apparatus for retrieving the recorded signal from the recording medium for analysis and integration.

An example of an analytical signal is the output signal of a chromatographic process wherein a unipolar voltage having a base line value approximating zero represents analytical information by fluctuations from the base line value. Such signals are of long time duration. Moreover, the usual analysis of such signals to obtain information from them represented by the peaks of fluctuations is such that extreme accuracy is required for the signals as they may fluctuate over a range of signal intensity of upwards to sixty or seventy db. The difficulties of recording a signal of such a wide dynamic range and thereafter obtaining an output signal through playback equipment for use in measuring the area under the fluctuations of the analytical wave forms are manifold, most particularly in view of the fact that accuracy on the order of one-tenth of one percent or better is highly desirable. With these difficulties and many others in mind, it is therefore an object of this invention to provide a means for recording signals of long time duration with high fidelity and also means to playback the recorded signal for reforming the analytical signal.

One object of this invention is to provide new and improved means for recording on a magnetic medium a signal having a dynamic range of at least eighty to one hundred db whereas magnetic mediums now available have a range of only thirty or forty db in dynamic signal fluctuations using techniques such as conventional frequency modulation.

A related object of this invention is to provide a new and improved recording system having means therewith for further increasing the dynamic range, typically by an additional twenty db or more.

Another object of this invention is to use with an analytical signal source recording techniques not susceptible to fading or loss of sensitivity of the magnetic medium.

An additional object of this invention is to provide a new and improved signal recording apparatus which incorporates means avoiding the ever present problems of wow and flutter found in all recording systems utilizing magnetic mediums.

An important object of this invention is to provide means for remotely recording an analytical signal and deriving a time integral thereof through the medium of mechanically-driven recording and playback means in which speed errors in recording or reproduction alter amplitude and inversely alter the time of the integral summation so that errors are essentially cancelled to provide a true integral of the area under the curve.

Another object of the present invention is to provide a new and improved tape recording and playback system transferring identification numbers so that later playback of a multitude of signals will not require attendance wherein the playback signals are appropriately identified.

One object of the present invention is to provide a new and improved analytical signal recording and playback apparatus for use with any number of consecutive analytical signals wherein it is possible to separate the data associated with each, identify same and automatically obtain the integral of the areas under the various peaks of a multitude of signals.

Still a further object of the present invention is to provide a new and improved recording and playback apparatus for use with multiple analytical signals wherein the apparatus makes use of signals which saturate the magnetic medium and are not susceptible to variations in the amplitude of the signal impressed on the medium.

An additional object of the present invention is to provide a new and improved recording apparatus wherein signal offset is recorded with the signal and is cancelled by a recorded reference signal during playback whereby base line values of the signal are reproduced accurately.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 3:
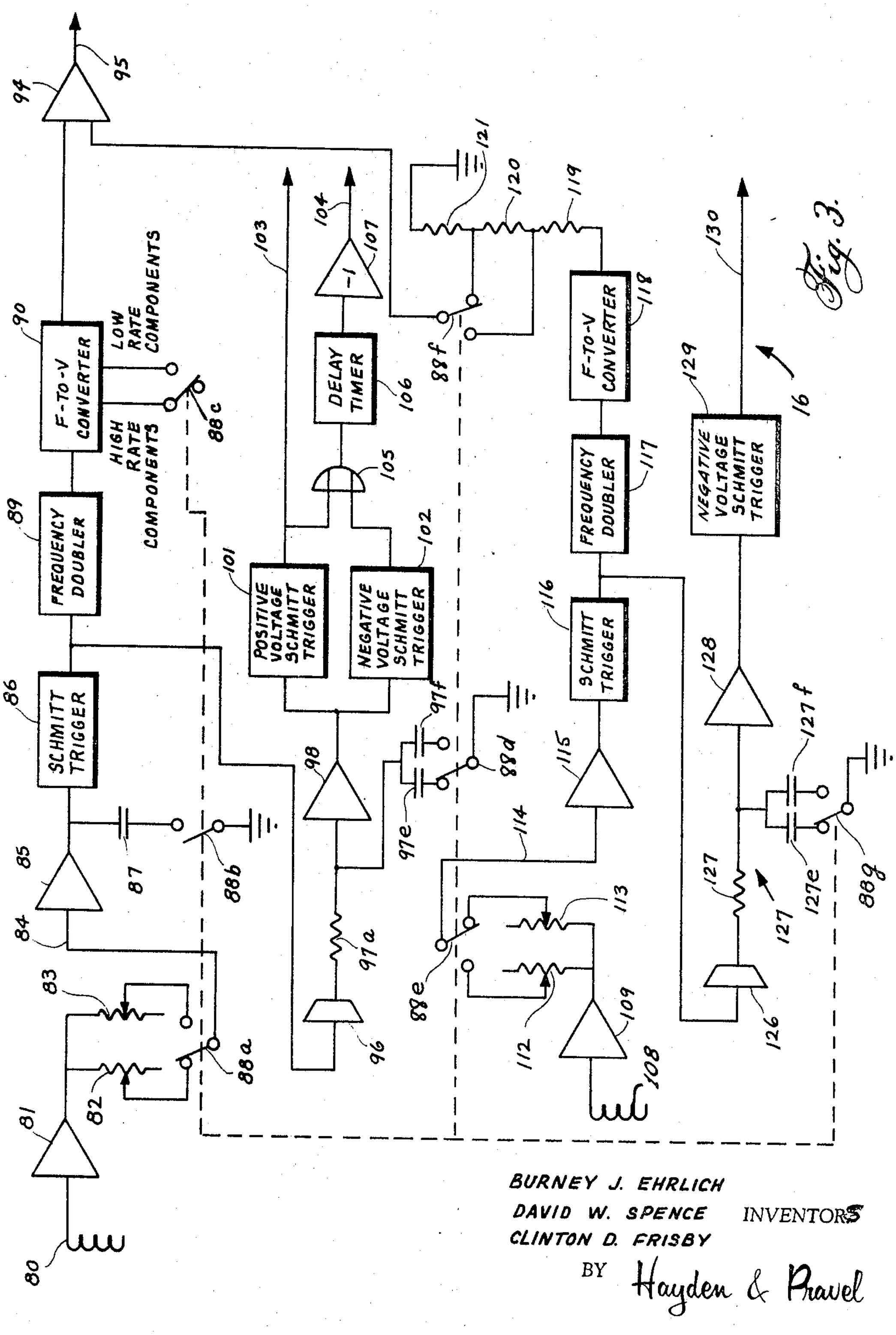
FIG. 3 is a schematic block diagram of playback apparatus for deriving output signals from a magnetic medium formed in accordance with the teachings of the present invention.
Figure 8:
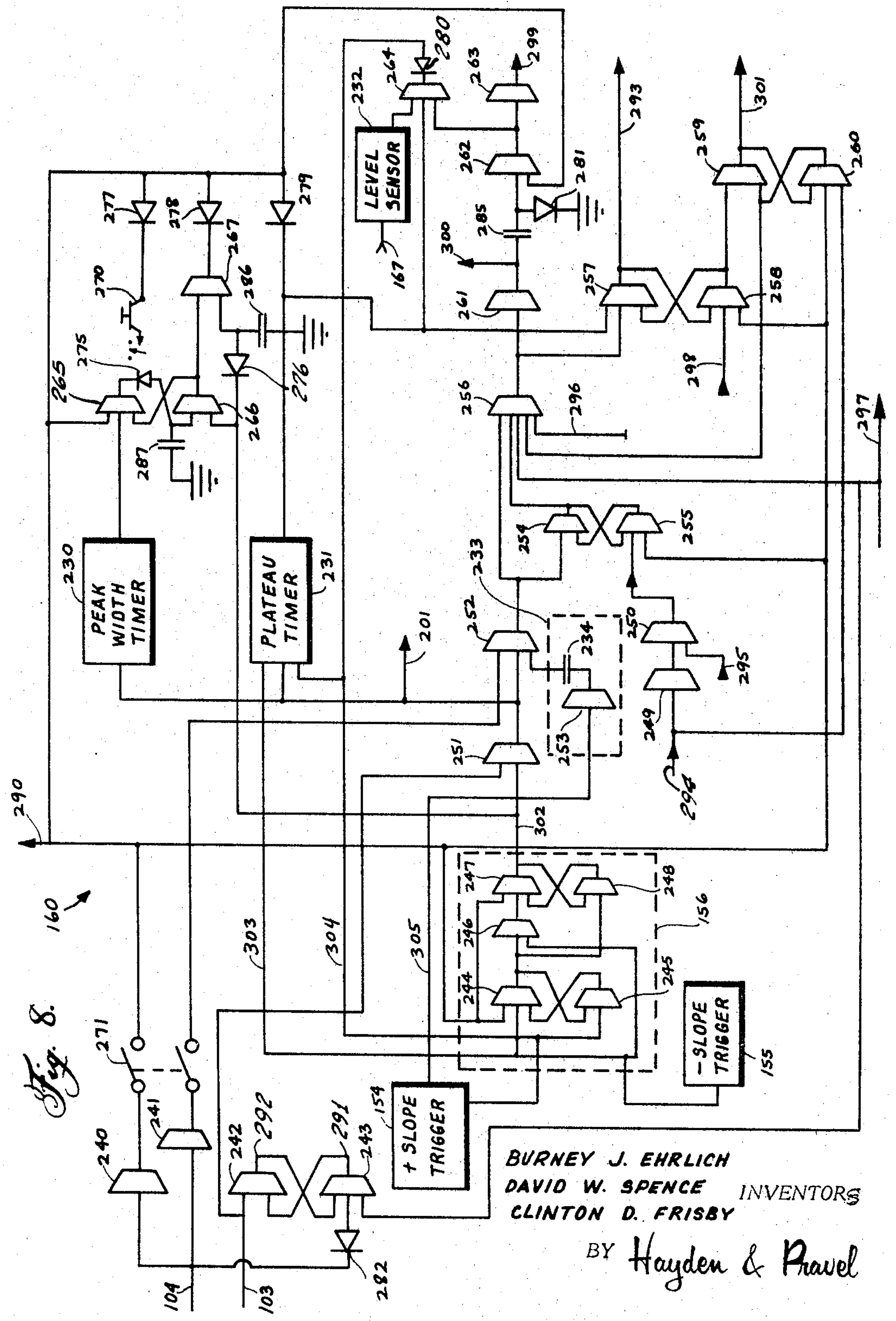
Figure 9:
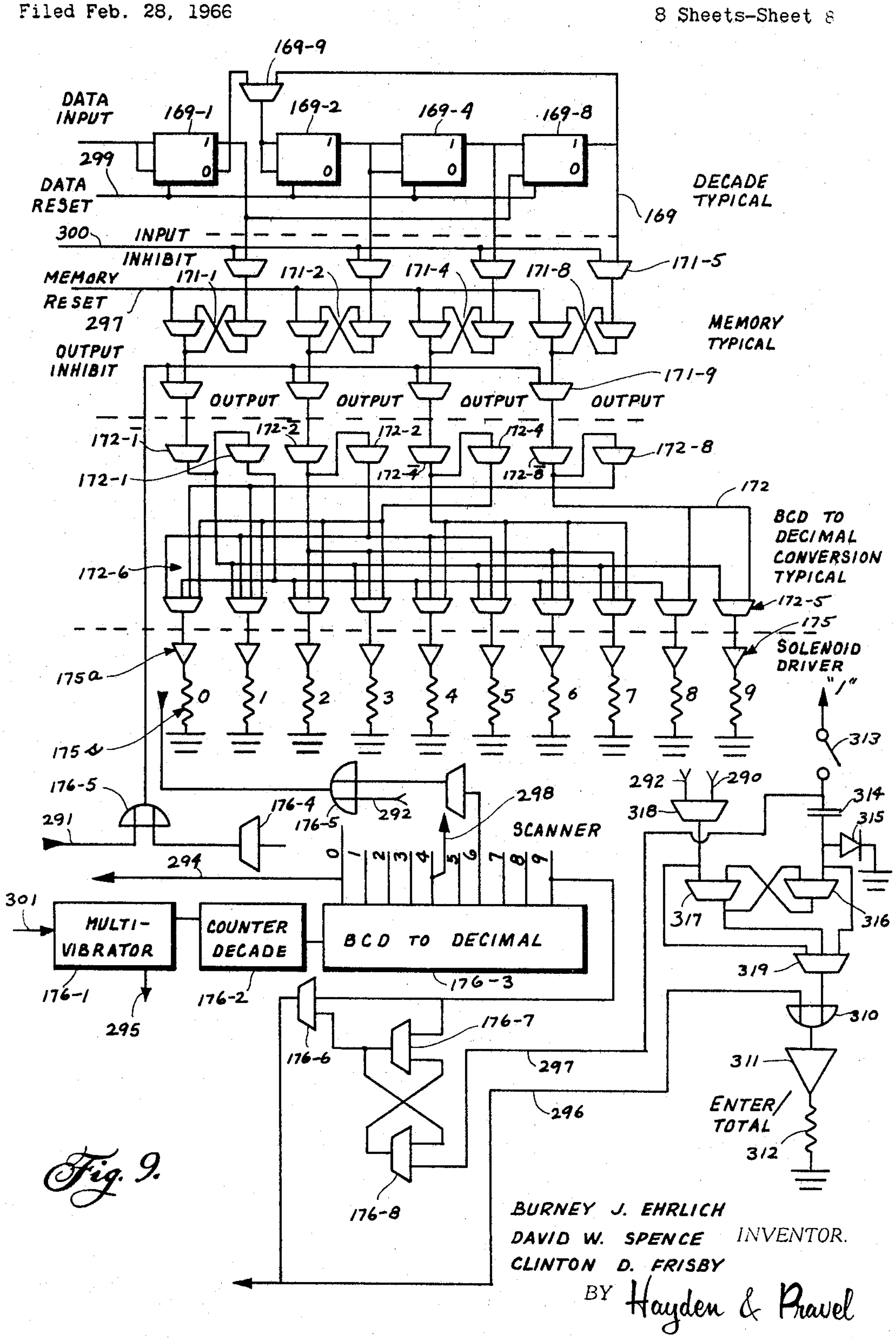

FIG. 8 also shows in greater detail interconnection with the playback means of FIG. 3; and FIG. 9 illustrates additional circuit means whereby data accumulation and transfer is effected.

Figure 1:
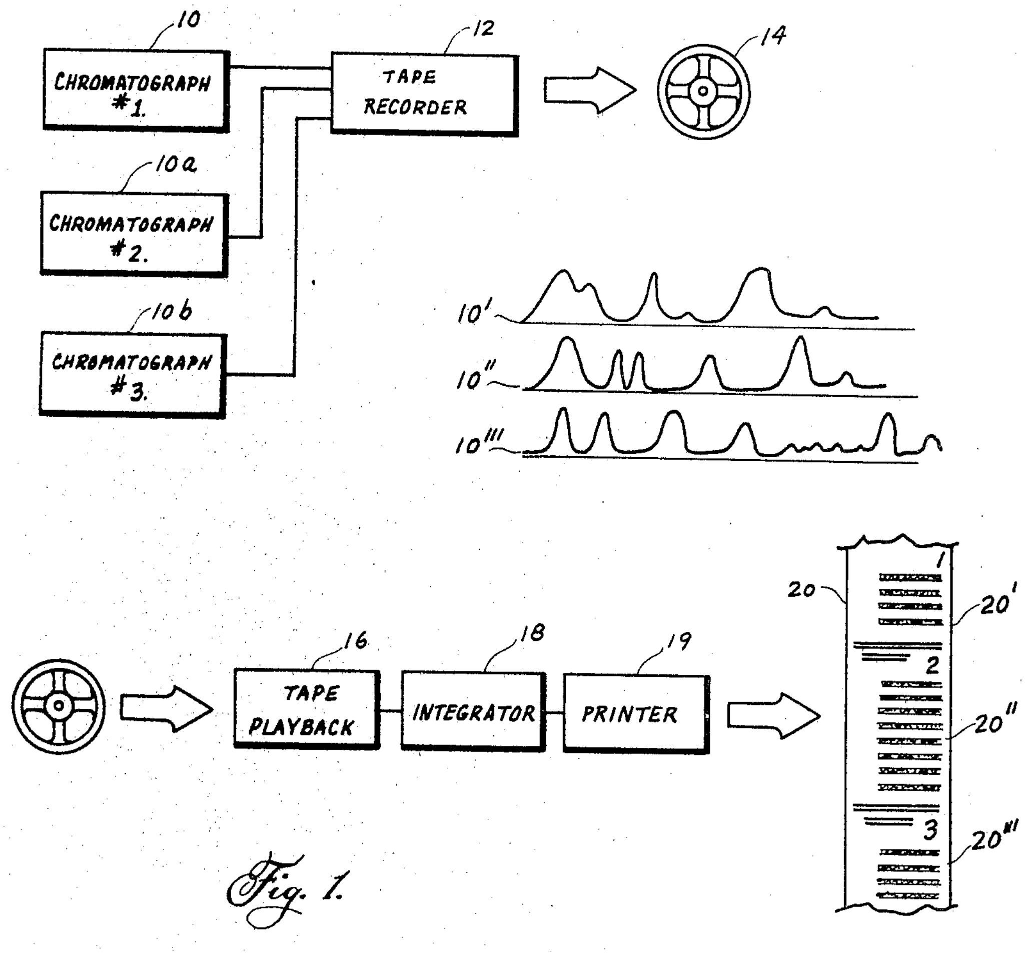
FIG. 1 is a block diagram representing the use of the present invention to obtain analytical signals from a plurality of sources showing how the analytical signals are finally output as integral summations.

Considering the invention broadly, attention is first directed to FIG. 1 which illustrates symbolically a chromatograph 10 which is connected to a tape recording apparatus 12 for the purpose of recording on a magnetic medium 14 signals representing data which is retrieved on playback at some convenient time thereafter. The recorder 12 is also connected to other sources such as additional chromatographs represented at 10*a* and 10*b*. It will be appreciated by those skilled in the art that the input devices for the tape recorder 12 may be any source of analytical signals such as transducers known in the art.

An output signal is represented at 10′ to indicate the nature of the signal recorded by the tape recorder 12 as output by the chromatograph 10. In addition, other representatives output signals are indicated at 10″ and 10‴ as output signals of additional sources 10*a* and 10*b*. It may be appreciated that with the present invention, the multitude of analytical signals may be recorded by the tape recording apparatus 12 as they occur either sequentially in time or simultaneously with respect to one another.

The magnetic medium 14 is made available some time after recording for purposes of playback on the tape playback means indicated at 16. The means 16 provides an output signal which is applied to the input of an integrator 18 which integrating device preferably provides a numerical output representation of the analytical fluctuation shown in the wave forms (such as signal 10′) wherein a printer 19 forms a numerical representation of the integrated results from the integrator 18. The output of the printer can be in many forms, but FIG. 1 illustrates a printed paper tape 20 on which is printed several sets of data. The first set of data is indicated at 20′ and represents the integral of the various peaks in the wave form 10′, the area of each of the peaks being summed in units of voltage-time and a total being taken thereof. In addition, the analytical wave form 10″ is likewise integrated and output data is formed on the paper tape 20 to represent the integral of the various peaks in the signal 10″ and again a total is taken. Obviously, this process can be extended to any desired number of analytical signals in the above-described manner. It should also be noted that the first wave form 10′ is identified by an identification numeral 1 which is printed on the tape 20 above the data 20′. As will be appreciated by those skilled in the art from the further disclosure hereof, the present invention provides means for recording and later obtaining a playback of data with an extreme degree of accuracy in a new and improved manner.

Figures 2, 2A:
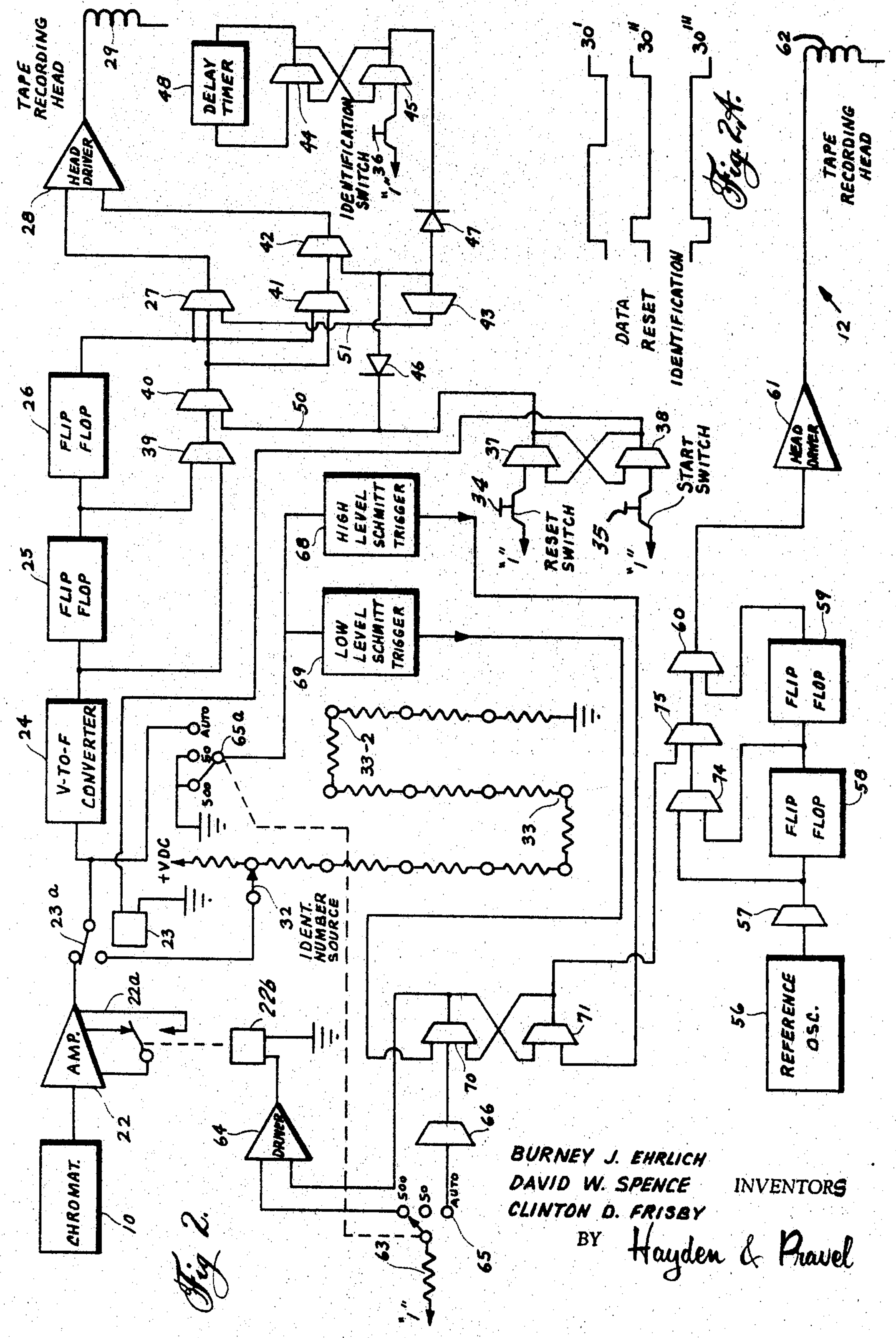
FIG. 2 is a schematic block diagram of recording apparatus of the present invention suited for use with an analytical signal.
FIG. 2A is a plurality of waveforms recorded by the present invention.

Considering the invention in detail, it is helpful to first consider the tape recorder 12 which was indicated generally in block form in FIG. 1. FIG. 2 illustrates details of construction of the tape recorder means 12. The DC amplifier 22, by example and not limitation, is a chopper-equipped amplifier with suitable demodulating means therewith. The amplifier 22 is preferably feedback stabilized and includes a feedback loop indicated at 22*a* which incorporates a pair of feedback resistors having a relationship relative to one another such that the output of the amplifier 22 is varied by a gain of tenfold on choosing one of the feedback resistors over the other. More specifically, a relay 22*b* is connected to choose one of the two feedback paths so that the gain of the amplifier is altered by a factor of ten when desired as will become more readily apparent hereinafter. At any event, the output of the amplifier 22 is provided through relay contacts 23*a* of a relay 23 to a voltage-to-frequency converter 24. In the normally unoperated position in FIG. 2, the signal from the amplifier 22 is applied to the converter 24 which converts the input to a procession of output pulses having an instantaneous frequency proportional to the amplitude of the signal from the amplifier 22.

The output pulses of the converter 24 are symmetrical in that they are provided with half wave portions of equal time length, forming a square wave form. The output of the converter 24 is connected to a first flip flop 25 and thereafter to a second flip flop 26 so that the frequency or rate of pulses is diminished by a factor of four in normal operation. The pulses from the flip flops 25 and 26 are then input to a NOR gate 27 which, as presently described, inverts the pulses to provide an input to a head driver amplifier 28. As will be appreciated, inversion of a square wave simply yields an out of phase square wave but this is of no particular consequence to the symmetry of the wave form of a signal which is eventually recorded on the magnetic medium. The head driver amplifier is a conventional amplifier providing the proper output voltage to a tape recording head represented at 29. The tape recording head places the square wave on the magnetic medium 14 as the medium is operated past the tape recording head 29 by conventional tape deck transport means known to those skilled in the art.

It will be appreciated that the apparatus described so far and shown in FIG. 2 provides a means for recording a saturated wave form on the magnetic medium 14 which is proportional in frequency to the amplitude of the signal output by the source 10. For purposes that will become more readily apparent hereinafter, the V-to-F converter 24 is supplied with an offset or bias voltage so that true zero input from the chromatograph 10 is represented by some selected frequency of output signal resulting from the offset. This may be provided, by way of example, by an additional input to the converter 24 in the form of a potentiometer connected across a battery or the like with the potentiometer adjusted to provide the bias or offset voltage thereto. It will be appreciated by those skilled in the art that the converter 24 then provides an output signal at a predetermined frequency which is representative of zero output from the source and wherein the zero signal permits an increase above the predetermined reference frequency.

Additional circuitry is shown in FIG. 2 for altering the symmetrical output signal from the apparatus as applied to the tape medium 14. Reference is made to FIG. 2A which illustrates three labeled wave forms, the uppermost wave form 30′ representing analytical data and the remaining wave forms 30″ and 30‴ representing instructions to the playback and integrating apparatus as will be discussed in greater detail hereinafter.

An explanation of the source of the identification signal 30‴ evolves around operation of the previously-mentioned relay 23. On operation of relay 23, contact 23*a* is switched to a multiple switch 32 and to a selected junction in a voltage divider 33. The voltage divider 33 is connected to some positive voltage and includes a number of resistors serially connected to ground whereby the connection points of the series of resistors provide any one of ten or more voltage levels for the switch 32. The resistors are selected and arranged so that each of the contact points of the switch 32 represents a voltage level which is input to the V-to-F converter 24 as a fixed signal. Operation of the switch 32 to any of the selected levels provides a fixed voltage to the converter 24 with the wave form changed for a fixed length of time so that the integral provided by the integrator during the fixed length of time (see FIG. 1) includes a most significant numeral representing the number selected. By way of example, the switch contact 33–2 provides a voltage which, when recorded and played back, causes the printing of an identification numeral (2 in this case) by the printer 19 shown in FIG. 1.

FIG. 2A also illustrates the signal recorded by the tape recording head 29 onto the magnetic medium 14 for indicating reset to the apparatus, such signal being represented at 30″. The reset signal exists before and after data is recorded wherein the data results from conversion of the analytical signal from the chromatograph 10 to the pulses output by the converter 24.

Reset signal information is denoted by a distinctive wave form with respect to the wave form 30′ in response to operation of the reset switch 34. Reset is terminated and data is recorded by operation of the start switch 35 causing the relay 23 to connect amplifier 22 to the converter 24. In addition, an identification switch 36 is provided with the circuitry of the present invention. A plurality of NOR gates is connected to the aforementioned switches and the NOR gates are identified by the numerals 37 through 45 inclusive. In addition, diodes 46 and 47 are connected as shown, and a delay timer 48 is also used by the circuitry of the present invention. The NOR gates 37 and 38 form a latch retaining the signal level resulting from the last actuation of the two switches 34 and 35. When the reset switch is contacted, a binary one signal is input to the gate 37 which provides an output of binary zero. The gate 38 also outputs the binary one which causes the relay 23 to operate and disconnects the source 10 from the converter 24 to input a constant level signal to the converter 24. On the other hand, operation of the switch 35 to connect a binary one level input to the NOR gate 38 requires a binary zero output which returns the relay 23 to the illustrated position in FIG. 2. Such opening of the relay 23 connects the amplifier 22 to the converter 24 and restores connection of the analytical signal from the source 10 to the tape recording apparatus 12 of the present invention.

The NOR gate 39 outputs a binary one in coincidence of binary zeros at both its inputs to form a rectangular wave form proportioned in the ratio of three to one which is input to the gate 40. The latched gates 37 and 38 provide an input to the gate 40 over the conductor 50, it being noted that operation of the start switch 35 (switch used to record data such as wave form 30′) is related to the output of gate 40 by inputting a binary one to the gate 40 which requires a binary zero level output as long as the apparatus is treating data. However, on actuation of the reset switch, the inverted wave form output by the gate 40 from the NOR gate 39 is input as a second input to the gate 27. The relationship of the output signals of the converter 24, the first flip flop 25, and the second flip flop 26 is such that the NOR gate 27 outputs a wave form having two levels divided in the ratio of seven to one. Such wave form is represented by the reset signal 30″ which is shown in FIG. 2A.

NOR gate 27 is provided with a third input over the conductor 51. Binary zero in the conductor 51 permits control of the output of the gate 27 to be vested exclusively in the wave forms output by the converter 24, flip flop 25, and flip flop 26. Alternatively, binary one in the conductor 51 requires a continued binary zero output from the gate 27 to suppress its output for purposes as will be recognized. More specifically, suppression of the output of the gate 27 prevents inputting the reset signal 30″ to the head driver amplifier 28. Operation of the switch 36 to connect the binary one as an input to the NOR gate 45 forms a binary zero which is input to the NOR gate 43. Since the identification switch 36 is operated only after operating the reset switch 34, binary zero input to the gate 43 causes a binary one output which holds the output of the NOR gate 27 at a binary zero level. By these means, the NOR gate 27 is prevented from passing the wave form 30″ shown in FIG. 2A. It should be noted that NOR gate 41 is provided with the same inputs as the gate 27, save the input of the conductor 51. Thus, the output of the gate 41 is identical to the output of the gate 27 when the gate 27 is permitted to pass pulses in accordance with the signal on conductor 51. NOR gate 42 inverts the output of NOR gate 41. It will be appreciated that signal 30‴ is an inverted version of the signal 30″ said inversion being provided by the NOR gate 42. However, the NOR gate 42 is only permitted to operate when and if it is desired to form an identification signal 30‴. Thus, inputting zero binary levels to the gate 43 suppresses the output of the gate 27 and permits the gate 42 to invert the signals output by the gate 41 to form identification wave form 30‴. Thus, the gates 37 through 45 operate in response to the switches 34, 35, and 36, to form the three way forms shown in FIG. 2A.

As previously noted, the adjustable multiple switch 32 which is adapted to be positioned to any point of the voltage divider 33 to form a level (an indication digit) transfers the identification digit to the magnetic medium 14 with the extent or duration controlled by the delay timer 48. More specifically, the gates 44 and 45 form a latch with the output of the gate 44 being fed through the delay timer 48 and back to the input to terminate operation of the latched gates after a predetermined interval. By way of example, such interval may be any fixed length of time so that the integral of area under a signal wave form generated by a constant level (supplied by the switch 32) includes a most significant figure which is one of ten digits provided for identification. This will be understood when considered in greater detail hereinafter.

In summation, the circuitry described thus far provides a saturated wave form to be recorded on the magnetic medium 14 wherein one wave form 30′ indicates transmission of data, another wave form 30″ indicates resetting of the apparatus which occurs before and after transferring data to the magnetic medium, and wherein the identification of a sequence of data is also signified by recording an additional wave form, the wave form 30‴ shown in FIG. 2.

Attention is next directed to the lower portions of FIG. 2 which illustrates a reference oscillator 56 which is connected as an input for a NOR gate 57. The output of the oscillator 56 is a conventional sine wave which is applied to the input of the NOR gate 57 in sufficient amplitude to square off the peaks and form an approximate square wave output. The output of the gate 57 is provided to a first flip flop 58 and a second flip flop 59 which reduces the frequency by a factor of four. The output of the NOR gate 60 is connected to a head driver amplifier 61 which is quite similar to the amplifier 28 provided for the data channel. The head driver 61 communicates with the conventional tape recording head 62 which is represented schematically as a coil. Again, the tape recording head 62 is similar to the recording head 29. The heads 29 and 62 are positioned to apply signals to the magnetic medium 14 simultaneously with respect to one another so that the instantaneous signal recorded on the data channel has a corresponding instantaneous signal recorded on the reference channel. The significance of this will become more apparent hereinafter when the playback apparatus is described.

The data recorded on the reference channel of the magnetic medium 14 has a wave form which is approximately square, or which resembles the data wave form 30' shown in FIG. 2A. The major difference is the fact that the frequency of the data wave form 30', is variable whereas the output signal of the reference oscillator 56 is fixed in frequency so that the wave form recorded by the tape recording head 62 is without variation.

The tape recording apparatus of the present invention can be constructed of circuit components to cooperate with input signals from the source 10 extending up to some predetermined level. In the preferred embodiment, it has been decided that a nominal level of 50 millivolts represents a reasonable operating range in view of the usual output signal from sensors such as the chromatograph or the like. However, occasionally, the use of the present invention will require a greater dynamic range. The greater range selected for the present invention permits a maximum input of 500 millivolts, or a range ten times greater than the above-noted low range. To this end, means are provided for recording signals which exceed the low range limitation (50 millivolts) wherein the signal applied to the V-to-F converter 24 is reduced by a factor of tenfold.

In FIG. 2, a series resistor 63 is connected to a binary one voltage level and operates through a switch 65 to apply a signal to a driver amplifier 64. The switch 65 is a range switch which provides a 500 millivolt range, a 50 millivolt range or an automatic range wherein the apparatus automatically adjusts the gain of the data recording channel to accommodate signals exceeding 50 millivolts and up to about 600 millivolts. To record signals on the 500 millivolt range, the range switch 65 is connected by way of the resistor 63 to provide a binary one level input to the amplifier 64 which operates the relay **22*b*. As previously noted, the relay 22*b* cooperates with the amplifier 22 to select one of a pair of feedback resistors which are so chosen and selected to alter the gain of the amplifier 22 by a factor of ten. That is to say, in the 500 millivolt range, the gain of the amplifier 22** is reduced by a factor of ten. It will be appreciated that the data is recorded in the usual manner.

The range switch 65 provides a second terminal which simply maintains the data recording channel as previously described wherein 50 millivolts input signal is the maximum permitted to the amplifier 22.

The range switch 65 includes a third terminal which places the apparatus in automatic range switching condition. The apparatus, as will be noted hereinafter, switches automatically between the two ranges so that the data never exceeds linear recording limits. The operation of the range switch 65 to the third position connects the binary one level through the resistor 63 to a NOR gate 66 and inverts same to provide a zero output. Said zero output has no effect on the apparatus connected to the gate 66 until the input signal exceeds some predetermined level. The range switch 65 has an additional switch **65*a* which is also provided with three input terminals. When the switch 65 is operated to the automatic terminal, the ganged switch 65*a* is also operated to the automatic terminal which connects the output of the amplifier 22 to the switch 65*a* and therethrough to a pair of Schmitt triggers. The Schmitt triggers are the high level Schmitt trigger 68 and the low level Schmitt trigger 69. The components of the Schmitt triggers are selected so that the high level Schmitt trigger trips and forms an output signal when the input signal from the source 10 exceeds some predetermined level, such as 50 millivolts or so. The level is selected to prevent the signal from exceeding the linear range, 60 millivolts, of the apparatus. Hysteresis is provided wherein the low level Schmitt trigger 69 trips to provide a one output signal when the signal input to the amplifier drops below some level such as 40 millivolts or so. It will be appreciated by those skilled in the art that the trip levels of the triggers 68 and 69 should not be equal since this would introduce the possibility of hunting in the apparatus. It should also be noted that both of the Schmitt triggers 68 and 69 are provided with the amplified output signal of the amplifier 22 which includes the means for adjusting the gain thereof so that when the level passes the predetermined trip level of the Schmitt trigger 68, the amplifier is reduced in gain by tenfold which drops the level below the predetermined level of the Schmitt trigger 68**.

A pair of NOR gates 70 and 71 have inputs from the range switch 65, and the Schmitt triggers 68 and 69. Consider operation of the apparatus for an input signal from the source 10 which increases from some base line value (in the microvolt range) to 200 millivolts. As the level passes the predetermined level of 50 millivolts, the high level Schmitt trigger 68 operates to form a binary one which is input to the gate 71. The output of the gate 71 is a binary zero which is input to the gate 70. The three inputs to the gate 70 are also binary zeros since the NOR gate 66 inverts the binary one provided through the resistor 63, and the input signal to the low level Schmitt trigger exceeds its trip level and forms a binary zero output (only when the input to the low level Schmitt trigger 69 is below its predetermined level does it provide a binary one output). The inputting of zeros to the gate 70 forms a binary one output which is connected to the driver amplifier 64. It will be recognized that the output of the binary one from the gate 70 is equivalent to the selection of the 500 millivolt range by the range switch 65 in that both provide binary ones to the driver amplifier 64. The driver amplifier 64 operates the relay **22*b* to reduce the gain of the amplifier 22 by a factor of 10. It should be noted that the gate 71 is provided with the output of the gate 70 to maintain same in a latched condition even though the high level Schmitt trigger 68** drops out after the binary one output is formed.

Figure 6:
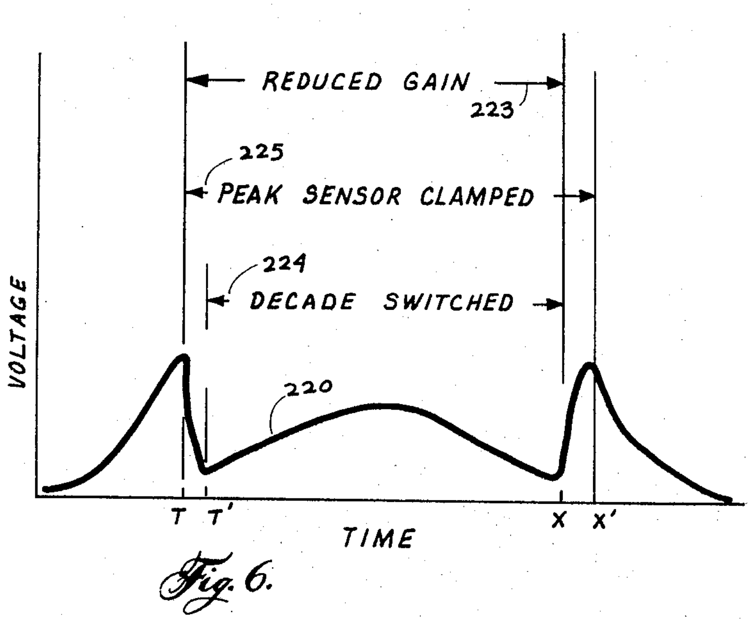
FIG. 6 is a graphic representation of a peak effected by changes in gain.

This condition will continue as long as the input signal from the source 10 exceeds the predetermined level, it being noted that the level in question is the output of the amplifier 22 with gain reduced by tenfold and measured with respect to the low level Schmitt trigger 69. Continuing further with the example, when the output of the amplifier drops to about 40 millivolts (effectively 4 millivolts output since the amplifier 22 is operated at reduced gain), the low level Schmitt trigger 69 is operated to form a binary one output. The binary one input to the gate 70 requires a binary zero output therefrom which terminates operation of the relay **22*b* to thereby increase the gain of the amplifier 22. The gain jumps upwardly by approximately tenfold immediately to terminate the one output from the Schmitt trigger 69. However, this has no effect on the gates 70 and 71 since they are latched. Reference is made to FIG. 6 for an illustration of the output signal from the amplifier 22. Thereafter, the low level Schmitt trigger may be triggered again to provide a binary one to the input of NOR gate 70 which is inconsequential to the latched gates. Thus, it will be recognized that the Schmitt triggers 68 and 69** control dual ranges of operation of the recording channel which are automatically selected to thereby increase the recording capabilities of the present invention by 20 db.

It is necessary to inform the playback apparatus that the automatic range switching apparatus above described is operated whereby changes are effected in the integration of the signal retrieved from the magnetic medium 14 to avoid the error of integrating same without weighting the signal to be integrated. To this end, the reference signal recorded by the recording means is changed in wave shape to indicate alterations in recording levels of the apparatus 12. The NOR gates 70 and 71 which provide output signals indicating the operating range of the apparatus are connected as inputs to the NOR gate 75 which is then connected to the NOR gate 60. Additionally, a NOR gate 74 is provided with the output of the NOR gate 57 and the flip flop 58. When the apparatus is in the low range or the 50 millivolt recording range, the gate 71 which is latched with the gate 70 outputs a binary one. The binary one at the gate 75 requires a continuation of the binary zero output which has no effect on the gate 60 and which permits that gate to operate as an inverter for the output pulses for the flip flop 59. Therefore, low range recording levels in the data recording channel are signified by recording a square wave for the reference signal which square wave has approximately one to one proportion between the two halves thereof and which is similar to the wave form 30′ shown in FIG. 2A. On the other hand, when the apparatus operates on occurrence of large input signals to reduce the gain of the amplifier 22 by a factor of 10, the gate 71 outputs a binary zero to the gate 75 which permits the gate 75 to invert the output pulses of the gate 74 and input same to the gate 60. This causes the gate 60 to effectively add the fundamental frequency output by the reference oscillator 56 (and squared off by gate 57), one-half frequency output by the flip flop 58, and a wave form having one-fourth the frequency of the reference which is output by the flip flop 59. Addition of these three wave forms at the gate 60 forms a non-symmetrical wave form wherein the two portions thereof have a ratio of approximately seven to one and which generally resemble the wave form 30″ shown in FIG. 2A. It should be noted that both wave forms are recorded by the tape recording head by fully saturating the magnetic medium 14 wherein no changes in recording levels are affected.

The magnetic medium 14 after receiving a signal and recording same thus carries in two channels information as above described. In the data recording channel, it may record data, instructions resetting the apparatus before and after the recording of data, and possibly identification digits when desired. Also, the reference channel records a reference square wave or a signal including information signifying the operating range of the apparatus 12 as above described. At this point, it should be noted that the tape heads 29 and 62 are operated in timed synchronism so that both signals on the magnetic medium 14 are made equally susceptible to errors introduced by the recording apparatus. As will be appreciated by those skilled in the art, it is difficult and quite expensive to build a tape recording mechanism which reduces recording errors, such errors commonly being denoted as wow and flutter. Since the tape mechanism does not operate at a perfectly constant velocity and since such variations in velocity may be likened unto modulation signals added to the information recorded on tape, it is recognized that errors are introduced by the recording apparatus.

In view of the imperfections of mechanical recording apparatus, the reference channel provides a means whereby equal percentage errors are imparted to both channels of data recorded on the magnetic medium 14 so that playback cancellation of one error against the other is made possible for signal levels approximating the reference level to avoid alterations in the data at that level. At higher signal levels indicative of analytical data, speed error cancellation and slope sensitivity provided by the present invention are altered. Thus, maximum cancellation occurs at base line levels. Because of this, it is of significance that the tape head 29 and the tape head 62 be placed so that simultaneous recording techniques are made available. For instance, if the heads are stacked on the recording apparatus 12, they should likewise be stacked in the playback apparatus. Or, if it should be desired to offset the tape heads linearly of the magnetic medium 14 with respect to one another, the offset should be identical in the playback apparatus so that any fluctuation or variation imparted to the signal recorded on the data channel is cancelled by an equal variation affecting the reference signal. A better understanding of this will be obtained by considering FIG. 3 which is a schematic block diagram illustrating the playback apparatus.

The playback apparatus is provided with dual speeds of operation which has the effect of speeding up the integration of data recorded on the magnetic medium 14. Since the signal placed on the magnetic medium 14 is fully saturated, and since variations in the quality of the tape are not significantly important, then it is possible to record at a relatively slow speed which may be the conventional speed of one and seven-eighths inches per second. The apparatus shown in FIG. 3 may be operated to playback at a similar speed so that the data is recovered in real time relationships. However, the playback apparatus 16 is provided with a speed of seven and one-half inches per second which is four times greater than the recording speed and which has the effect of compressing the signal in time by a factor of four. Of course, other recording and playback speed ratios may be used. It will be appreciated that this has an economy in the use of the integrator apparatus 18 (see FIG. 1) and enables the handling of more data with the same investment in equipment. The data channel is provided with a playback head 80 which is mounted on a tape playback deck. The head 80 is connected to an amplifier 81 which amplifies the output pulses derived from the deck head 80. At this juncture, it should be noted that since saturated levels are recorded on the magnetic medium 14, the head 80 detects only changes in level and thereby outputs what is essentially a derivative of the recorded signal. However, the derivatives resemble pulses having a frequency or repetition rate related to the signal recorded on the medium 14 so that no information is lost even though the playback wave form is quite different from the wave form recorded by the recording apparatus 12. At any event, the amplifier 81 forms an output signal which is connected to both of a pair of potentiometers 82 and 83. A switch **88*a* is connected to the wiper arm of the potentiometers 82 or 83 and provides a signal on a conductor 84 which is input to an additional amplifier 88*a* is related to the speed of playback so that signal amplitude is maintained within controllable limits as input to the amplifier 85**.

The amplifier 85 is a conventional amplifier which forms an input signal for a Schmitt trigger 86. However, it should be noted that switch element **88*b* is communicated to ground for interconnecting filtering capacitor 87 to the output of the amplifier 85. On very slow speeds, additional filtering is required, thus necessitating the addition of the capacitor 87 to the circuitry when operating at the lower playback speed. The pulses input to the Schmitt trigger 86, while having the same repetition rate as the recorded pulses, do not resemble square waves. However, the Schmitt trigger 86 provides an output signal to a frequency doubler 89 which signal is essentially a square wave. The frequency doubler is a device known to those skilled in the art and simply functions to provide an output signal at twice the rate as the input thereto. In this case, the square wave output of the Schmitt trigger 86 is doubled in frequency by the doubler 89 and is thereafter applied as an input to a frequency-to-voltage converter 90**.

In general terms, the converter 90 is opposite in function to the converter 24 which is shown in FIG. 2. The converter 24 provides output pulses wherein the frequency is proportionally related to the input amplitude. The frequency-to-voltage converter 90 takes such pulses and forms an analog output signal wherein amplitude is proportional to the instantaneous rate of pulses input thereto. The operating rate of the converter 90 is subject to adjustment and to this end, a switch **88*c* is connected thereto to choose circuit elements to be substituted in the converter to permit operation at either a low rate or high rate of input pulses. It is desirable to increase the maximum frequency permitted to the converter 90 at the higher tape playback speed since the increase in speed by fourfold increases the input frequency by the same factor. The value of components substituted in the converter 90 by operation of the switch 88***c* depends on the maximum frequency rate selected. For instance, it is possible to provide an input frequency maximum as low as 500 c.p.s. or on selection of other components, it is possible to increase the maximum input frequency to 100,000 c.p.s., as desired. The high and low rate components may be all placed in the converter 90 and the selector switch 88*c* may be used to provide for operation of a relay or the like switching one set of components into the converter while disconnecting the other set of components therefrom. Those skilled in the art will appreciate this technique of component substitution or may be able to devise other techniques for increasing the operating rate of the converter 90.

The output of the converter 90 is provided to a differential amplifier 94 as one of the two input signals thereof. The output of the differential amplifier 94 is placed on the conductor 95 and represents the reconstructed analog signal which originated with the signal source 10 (see FIGS. 1 or 2) wherein all errors resulting from less than perfect recording and playback techniques are cancelled as will be described in greater detail hereinafter.

It should be noted in the playback channel of the playback means 16 that the switches 88*a*, 88*b*, and 88*c* are provided for actuation in selecting the accelerated playback speed which is four times greater than the recording speed. The switches are indicated in FIG. 3 as being mechanically ganged together and are also ganged with other switches to be described hereinafter.

It can be recalled by considering the wave forms in FIG. 2A that certain signals are provided in the data channel on the magnetic medium 14 which indicate something other than data. That is to say, the wave forms 30′, 30″, and 30‴ have special significance on playback. Advantage is taken of the characteristic that the wave form 30′ is provided with equal or identical half wave portions whereas the other wave forms have a ratio of about seven to one existing between the binary states of the signals. Thus, the output of the Schmitt trigger 86 is provided through a NOR gate 96 which inverts same and provides an input for integrating circuit means indicated at 97. The NOR gate 96 is a conventional NOR gate and serves the purpose of inverting the wave form since only one input signal is shown in FIG. 3. However, the NOR gate 96 is constructed and arranged of components connecting to voltages symmetrically arranged about zero potential so that the binary one level input thereto provides a voltage level above ground and equal to the offset on inputting a binary zero. That is to say, the output levels of the NOR gate 96 may be spaced on both sides of zero potential by equal amounts. As an example, the output may be either +5 volts or −5 volts. Since the wave form 30′ which represents data is symmetrical with respect to zero potential as output by the gate 96, the integral should be zero as evidenced by the input signal provided to the amplifier 98. The integrator 97 includes series resistor 97*a* and grounded capacitors 97*e* and 97*f*. Switch 88*d* which is ganged to the other playback speed switches selects one of the two capacitors 97*e* or 97*f* for the integrating circuit means 97. Again, it will be appreciated that a variation of the playback speed increases the frequency of pulses input to the integrating means so that the response time to the integrating means is altered by utilizing integrating means with varied time constant.

As noted above, the output of the symmetrical wave form from the NOR gate 96 integrates to provide an essentially zero level input to the amplifier 98. However, an offset signal is provided by the integration means 97 when the data channel detects information in the wave form of 30″ or 30‴ shown in FIG. 2A. As between the wave forms 30″ and 30‴, the integral of one should be positive and the integral of the other should be negative, with the magnitude of both being approximately equal in absolute magnitude. The buffer amplifier 98 provides amplification of the signals to a pair of Schmitt triggers 101 and 102. If the offset approximates some absolute value of about five volts by way of example, the Schmitt trigger 101 is constructed and arranged with components which recognize a level of, say, three volts or more in the positive direction from zero potential whereas the Schmitt trigger 102 is rendered operative by inputting −3 volts or some greater value. Referring again to FIG. 2A, the wave form 30‴ which indicates identification enumeration in the data channel is more positive than negative when output by the NOR gate 96 so that positive voltage Schmitt trigger 101 forms a binary one in the output conductor 103 which signal will be utilized as explained hereinafter to indicate the presence of an identification numeral. On the other hand, the negative voltage Schmitt trigger 102, on detection of a negative voltage assists in providing a signal on the conductor 104 which indicates that data is not being recorded as will be utilized in the integration apparatus 18 and as will be explained in greater detail hereinafter.

In FIG. 3, the outputs of both Schmitt triggers 101 and 102 are connected to an OR gate 105 since the occurrence of either wave form 20″ or 30‴ (see FIG. 2A) indicates that valid data is not recorded in the recording channel of the magnetic medium 14. The output of the OR gate is connected to a short delay timer 106 and the output of the timer 106 is connected through an inverter amplifier 107 which forms the level indicating data recordation in the conductor 104. The signal in the conductor 103 (a binary signal) will be described hereinafter as the identification signal while the signal in the conductor 104 will be described as the data status signal. Both the conductors 103 and 104 are provided to the integrator 18 and utilized therein for operation as will be described.

The playback means 16 shown in FIG. 3 includes an additional playback head indicated at 108. The head 108 is positioned relative to the magnetic medium 14 to derive therefrom the signals representing the recorded reference signal. The head 108 is connected to an amplifier 109 and provides an output to a pair of potentiometers 112 and 113. The potentiometers are interconnected with the conductor 114 by operation of a switch 88*e* which is ganged with other switches to adjust the apparatus in response to change in playback speed. As previously noted, playback at a higher speed (seven and one-half inches per second) increases the time derivative of the signals detected by the pickup head 108 so that the signals input to the amplifier are larger and that therefore the two potentiometers 112 and 113 are needed to control the signal in the conductor 114. The conductor 114 is connected to an additional amplifier 115. The output of the amplifier 115 is provided as an input for a schmitt trigger 116. The Schmitt trigger converts the input pulses on obtaining a predetermined level to form output pulses having better square wave definition which are applied to a frequency doubler 117. The output of the frequency doubler is connected to an additional frequency-to-voltage converter 118. The components 116, 117, and 118 are quite similar in construction to the components 86, 89, and 90 which are included in the data playback channel shown in FIG. 3.

The output of the converter 118 is connected through a plurality of series resistors to ground, said resistors being indicated at 119, 120, and 121. Again, the playback speed control includes a switch 88*f* which selects the ratio of voltage divider comprising the series resistors connected to the converter 118 for supplying an output signal to the previously identified differential amplifier 94. As will be recognized by those skilled in the art, the differential amplifier 94 is provided with input signals from the data channel by way of the converter 90 and also is provided with the signal from the reference channel by way of the converter 118 whereby the output on the conductor 95 is the difference of the two signals.

In operation, let it be assumed that speed variations introduced error at the recording apparatus 12 wherein the data is time modulated to include error. It should be noted that such time errors are also modulated on the reference channel as the recording apparatus 12 places the signal simultaneously on the magnetic medium 14. Let it be further assumed that the playback deck introduces similar or different errors which effectively modulate the signal in that the time of playback is altered. Again, such facts are visited equally on the data channel as well as the reference channel of the magnetic medium 14. Thus, by way of example, if the playback were to speed up, the data would have the appearance of higher frequency and therefore imply a higher input voltage for a shorter time interval from the signal source 10. On playback, such speed up would be reflected in the output of the frequency-to-voltage converter 90 wherein the output signal would include an increment resulting from the increased speed of the tape. However, such speed up is equally effective on the data recorded on the reference channel so that the output of the converter 118 is also increased and, of course, the output of the converter 118 is input to the differential amplifier 94 also. The net difference between the two channels will remain the same for signal levels in the vicinity of base line so that the output of the differential amplifier 94 remains constant. It should be noted that while the output of the differential amplifier remains constant, the duration or extent in time of the signal is altered by the speed up to the apparent detriment of the fidelity of the system. However, such is not the case as will be described in greater detail hereinafter when relating operation of the integrator means 118 to operation of the playback means 16.

As previously noted in describing the circuitry in FIG. 2, the reference channel forms a symmetrical wave form related to the reference signal whereas an asymmetrical signal is formed to indicate range alterations in the recording apparatus. Such information is retrieved from the reference channel by deriving an output from the Schmitt trigger 116 and coupling same through a NOR gate 126. The NOR gate 126 is similar to the NOR gate 96 in that it is provided with output levels which are equally offset from some reference point, preferably zero potential. That is to say, when the wave form output by the gate 126 includes equal portions above and below the zero potential, the integral of the wave form over any interval of time is essentially zero. Integrating means is indicated at 127 and includes a series resistor 127*a* and a pair of grounded capacitors 127*e* and 127*f*. A switch 88*g* is provided for operation in adjusting the playback speed so that the time constant of the integration means 127 is varied. A buffer amplifier 128 is connected to the integrating means 127 and provides an output signal to a negative voltage Schmitt trigger 129. The negative voltage Schmitt trigger 129 is similar to the Schmitt trigger 102 and provides an output signal in a conductor 130 which is indicative of automatic shifting from the 50 millivolt range to the 500 millivolt range in the recording means 12. Of course, the negative voltage Schmitt trigger 129 provides essentially no output or a binary zero level when the wave form recorded in the reference channel is symmetrical.

Figure 4:
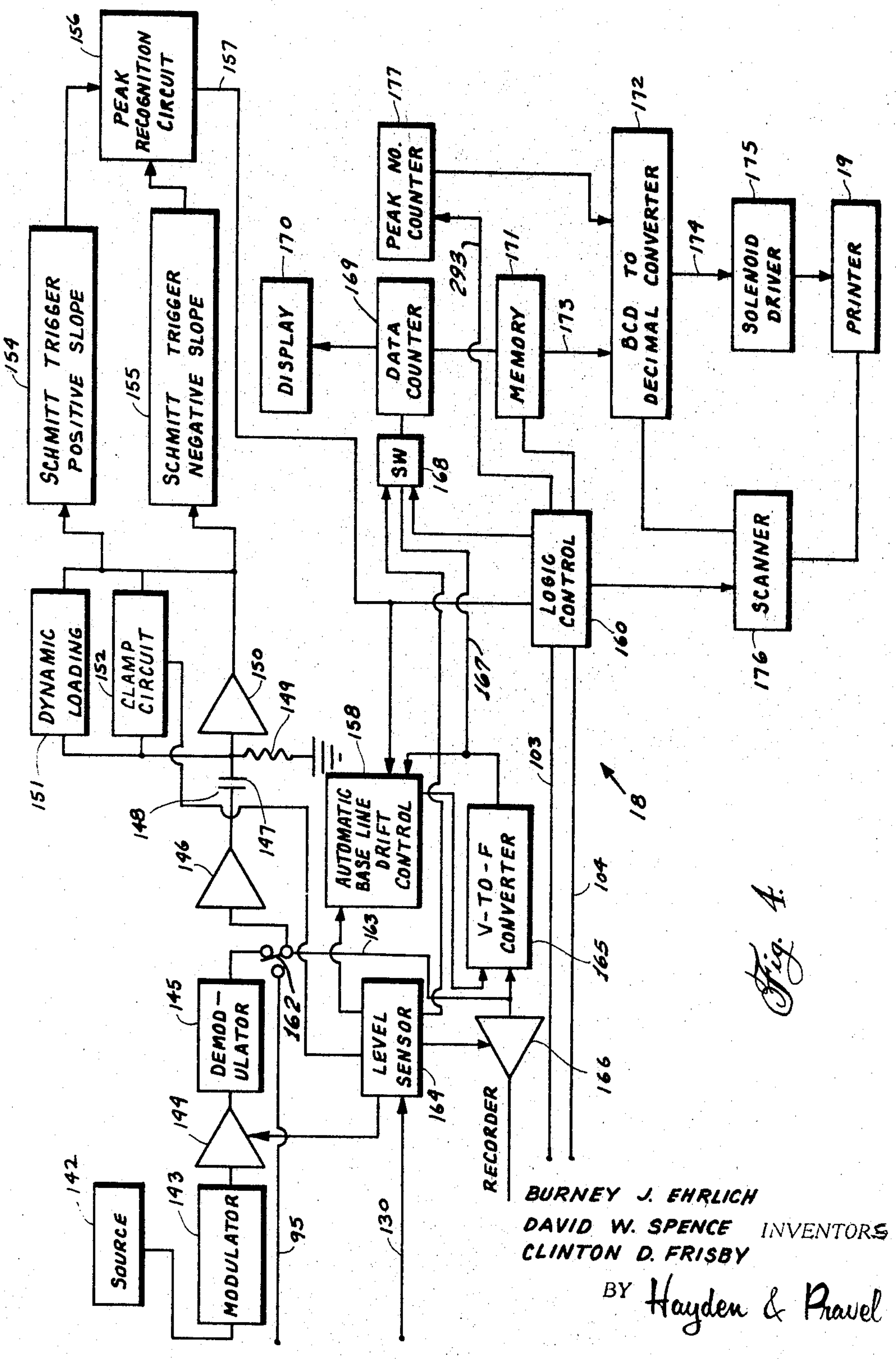
FIG. 4 is a schematic block diagram of an integrator which includes connections for the circuitry shown in FIG. 3 to provide automatic operation of the integrator in response to the output of the apparatus shown in FIG. 3.

The playback means in FIG. 3 incorporates four output conductors which are the conductors 95, 103, 104, and 130. They supply, respectively, a reconstructed analog signal from the source 10, a level indicating transfer of an identification numeral, a level indicating that data is being transferred and ought to be integrated, and a level indicating that the reconstructed signal has been reduced by a factor of ten due to the automatic ranging capabilities of the recording means 12. These four conductors are input to the integrator indicated generally at 18 and shown in FIG. 4. In FIG. 4, a block diagram schematic illustrates the integrator means 18. Additional disclosure concerning the integrator means 18 may be obtained from patent application Ser. No. 447,026, filed Apr. 9, 1965, and entitled "Integrator Device." For purposes of the present invention, the circuitry shown in FIG. 4 adequately illustrates the connection of the conductors 95, 103, 104, and 130 to the integrator means 18. In FIG. 4, means are provided for inputting a signal from a conventional source 142. The DC signal from the source 142 is connected to a modulator 143 which alters the DC signal to an AC signal which is coupled to an amplifier 144. The amplifier 144 provides an amplified output to a demodulator 145. The demodulator is connected to a driving amplifier 146 which drives differentiating means 147. The differentiating means detects positive or negative slope in the signal and by so doing operates additional circuitry to be described to indicate the presence or absence of analytical fluctuations in the signal from the source 142. The differentiating means 147 includes a capacitor 148 and a resistor 149 which is connected to ground. When the signal from the source 142 has a zero slope indicative of a fixed voltage, the voltage across the resistor 149 is essentially zero or is maintained at ground potential to indicate the absence of slope. Positive slope causes an accumulation on the capacitor 148 such that a positive voltage is registered across the resistor 149 whereas negative slope is indicated by negative potential across the resistor 149. These levels are applied to an amplifier 150 which has a high input impedance to prevent loading of the differentiating means 147. A pair of circuits is paralleled with the amplifier 150 and includes dynamic loading means 151 and clamping protection means 152. The dynamic loading means provides a feedback path around the amplifier 150 so that the output signal thereof is held reasonably close to the derivative signal input to the amplifier so as to reduce the response time on occurrence of large signal fluctuations. Also, the clamping protection circuit means 152 adds additional impedance means across the amplifier to clamp the input signal of the amplifier 150 during automatic range switching as will be described in greater detail hereinafter.

The circuit elements extending from the modulator 143 to the output of the amplifier 150 are used to detect the presence or absence of peaks in the signals from the source 142. A pair of Schmitt triggers 154 and 155 is connected to the output of the amplifier 150 and provide indications in the binary level signals of positive or negative slope wherein such signals are input to peak recognition circuit means 156. The output of the peak recognition circuit means 156 is carried by a conductor 157 to two major circuits shown in the block schematic of FIG. 4. First of these is the automatic base line drift control 158 which forms a feedback signal for removing drift from the analytical signal from the source 142. The correction of the drift signal will be made more readily apparent hereinafter. However, additional details can be ascertained concerning the operation of the automatic base line drift control circuitry means 158 from copending patent application Ser. No. 361,970, filed Apr. 23, 1964, now patent No. 3,359,410, granted Dec. 19, 1967, and assigned to the common assignee of the present invention. In operation of the integrator means 18 shown in FIG. 4, the conductor 157 is input to the base line drift control circuit 158 to prevent same from treating analytical peaks as drift and thereby forming a signal which would tend to cancel out the analytical information. Thus, the output of the peak recognition circuit 156 is used to withhold operation of the automatic base line drift control circuit as long as the peak subsists in the input signal provided by the source 142.

The second of the major circuits connected to the output of the peak recognition circuit 156 is the logic control circuitry 160. The logic control 160 controls the operation of various circuits to be described in the accumulation of data so that the integrator means 18 sequentially and automatically obtains a numerical total representing the integral of the various peaks in the analytical wave form. By way of example, referring again to the wave form 10′ shown in FIG. 1, each of the peaks of the wave form 10′ includes an area under the peak which provides useful information in the chromatographic process, as will be appreciated by those skilled in the art.

Thus far, means have been described for ascertaining the presence or absence of an analytical fluctuation which should be integrated by the integrator means 18. Yet to be described is means for converting such analytical fluctuations into an area by the integration of the amplitude with respect to time, and, of course, means for placing the integral in a format useful to the operator. To this end, the output of the demodulator 145 is connected through a switch 162 and by way of a conductor 163 as an input for a lever sensor 164 (as will be described in FIG. 5), a voltage-to-frequency converter 165 and an insolation circuit which can be amplifier 166 which is adapted to be connected to a chart recorder or the like, if desired. The V-to-F converter converts the analytical signal from the source 142 into a pulse train wherein the frequency is related to the instantaneous amplitude of the signal. The converter 165 can be similar or identical to the converter 24 shown in FIG. 2. The output of the V-to-F converter 165 is supplied by a conductor 167 as an input to a switch 168. The switch controls passage of the pulses to a data counter 169. The data counter preferably has a plurality (such as six or eight) of decades serially connected to accumulate a total count of the pulses supplied over the conductor 167. The data counter 169 is connected to a visible display 170, if desired, and is also connected as an input to a memory device 171. The memory device 171 is a data storage device permitting the data counter to be cleared immediately on termination of a peak whereby the total count of pulses is fed into the memory 171 and the data counter is prepared for resumption of counting from zero because of the possibility of an immediately following peak. The outputof the memory 171 is coupled through converting means 172 by way of a conductor means 173 wherein the converter means converts the binary coded decimal information stored in the memory 171 to decimal information for purposes of printing out useful data. The converter 172 communicates by way of conductor means 174 to a plurality of solenoid drivers 175 which are mounted on the printer 19 to operate same. Proper and timely transfer of the information in the memory 171 through the converter 172 and to the printer 19 is controlled by the scanner means 176 which sequentially takes the decimal digit information from the converter 172 in the order of the most significant digit to the least significant digit and enters same by operating the printer 19. After the data has been transferred, the scanner includes a step which operates the printer 19 to cause the printer to form a decimal representation on paper tape, or the like (see the tape 20 in FIG. 1), and also causes the printer to take a total when desired.

The circuitry of FIG. 4 includes a peak number counter 177 which also forms a number in binary coded decimal format and inputs it to the converter 172. However, this feature may be omitted from the integrator means 18. Other circuits may be used to accomplish other functions and may include, by way of example and not limitation, a clock source which is turned on at the commencement of data integration and whose accumulated value is printed out during the occurrence of a peak as recognized by the peak recognition circuit means 156. In operation, the clock source forms a pulse train which is input to two or three decades of counting circuitry similar to the data counters 169 so as to obtain the retention time of the peaks. This data is stored and transferred by the converter 172 to the printer in due order as will be explained in greater detail hereinafter.

As previously noted, the conductor 163 is input to three circuits shown in FIG. 4. The isolation circuit 166 provides isolation for the integrator means from the recorder connected thereto so as to avoid any deleterious effect on the quality of the signal as might occur when the recorder changes internal impedance or the like.

In addition to the converter 165 and the buffer 166, the conductor 163 provides an input for a level sensor 164. The integrator 18 shown in FIG. 4 includes automatic ranging capabilities wherein the possibility of overdriving the equipment is prevented since the level sensor 164 is connected to reduce the gain of the amplifier 144. However, this function is accomplished in the recorder means 12 shown in FIG. 2 and it is necessary to defeat the level sensor 164 during integration of a signal output by the playback means 16. The playback means 16 is an alternative source of a signal to be integrated in lieu of the signal source 142 shown in FIG. 4. The conductor 95 is input to the switch 162 to provide the alternative signal for purposes of integration. The actual circuitry is better disclosed in FIG. 5 as will be described hereinafter. In addition, the conductor 130 which indicates recording in the high or low range is input to the level sensor 164 as will be described in greater detail hereinafter. The conductors 103 and 104 are likewise input to the integrator 18 at the logic control means 160 to control same as will be described in greater detail and is shown in FIGS. 8 and 9. A description of these means will follow a description of the means shown in FIG. 5.

Figure 5:
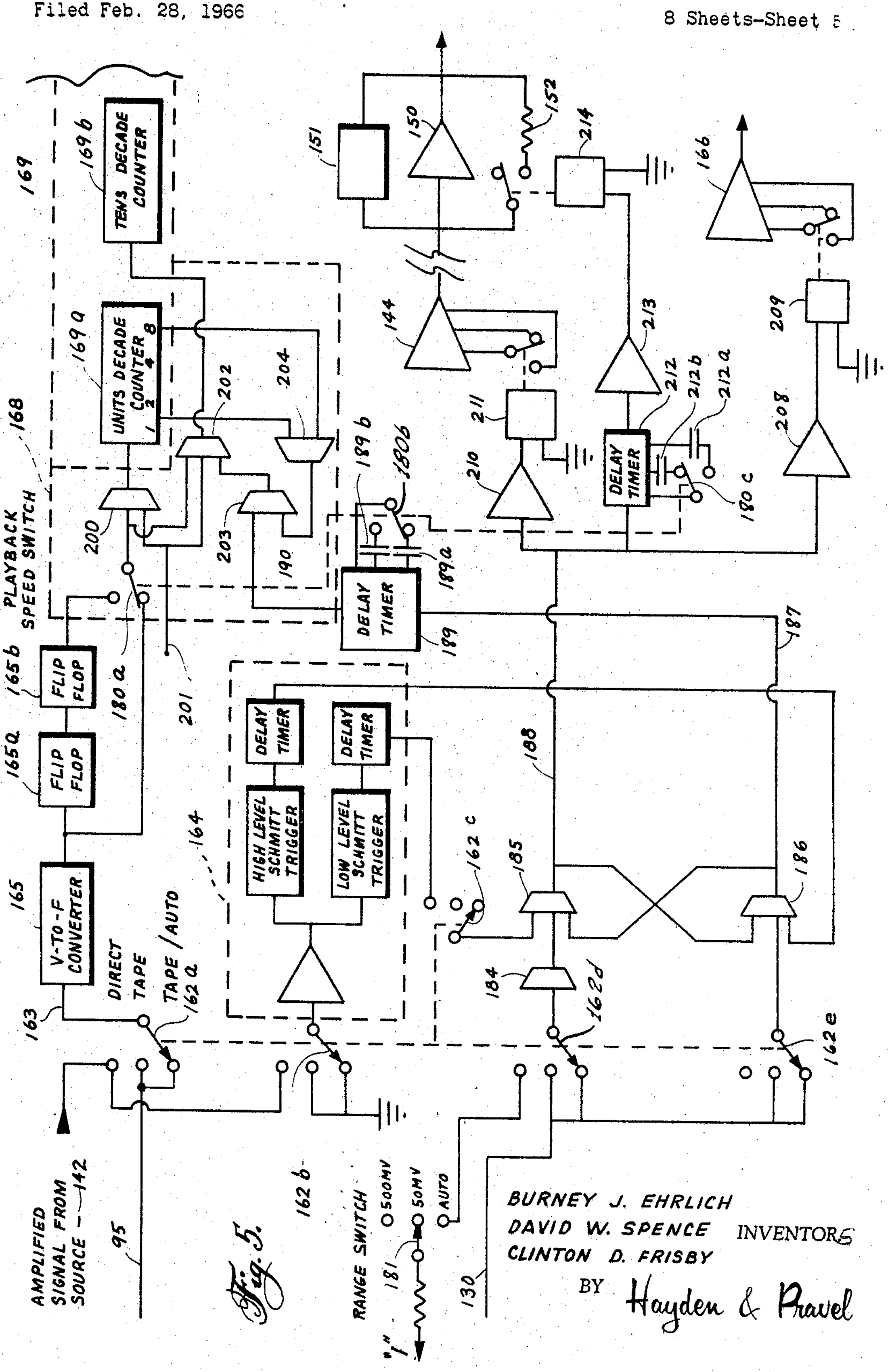
FIG. 5 illustrates in greater detail circuitry and connections shown in FIG. 4.

Attention is directed to FIG. 5 which illustrates the connection of the conductors 95 and 130 as was noted in describing FIG. 4. The switch 162*a* includes three terminals with the amplified signal from the source 142 connected to the first of the terminals and the conductor 95 connected to the second and third terminals. Operation of the switch 162*a* to the first terminal places the amplified signal from the source 142 in the conductor 163 and available for integration and routine operation of the integrator means 18. Operation of the switch 162*a* to the second terminal places the reconstructed signal on the conductor 95 in the conductor 163 and available for integration by the means 18. When the switch 162*a* is switched to the third terminal, the input from the conductor 95 is applied to the V-to-F converter 165 and additionally, connections are made as will be described which permit the circuitry to automatically range to the high or low range in accordance with the signals provided over the conductor 130. Thus, the switch 162*a* inputs the reconstructed analog signal to the converter 165 which converts the signal to the plurality of pulses which represent the area under the analytical peaks. The pulses from the concerter 165 are passed through a pair of flip flops 165*a* and 165*b* to the switch means 168 and then into the counter 169 for accumulation. The flip flops 165*a* and 165*b* connected to the converter 165 provide an input to the switch circuitry 168 dependent on the playback speed. On the slower playback speed, a switch 180*a* is connected to the output of the flip flop 165*b* whereby the pulse rate is diminished by a factor of four. On the other hand, operation of the switch 180*a* to the other terminal inputs the pulses directly from the V-to-F converter 165 at a higher rate which is associated with the faster playback speed. It should be noted that the playback speed switch 180*a* could be appropriately ganged with the switches 88*a* through 88*f* shown in FIG. 3.

When the switch 162*a* is operated to the third terminal which places the apparatus in the autoranging condition and connects the conductor 95 from the playback means 16 to the converter 165, the input signal for the level sensor 164 is grounded by operation of the switch 162*b*. This effectively disconnects the level sensor means 164 from the circuitry since level sensing is effected in the playback means 16 and not in the level sensor means 164. A switch 181 which is labeled the range switch communicates a binary one level with three terminals whereby conventional operation of the integrator means 18 is controlled. A switch 162*c* is used to connect one of the output signals from the level sensor 164 to circuitry to be described when the switch 162 is operated to the first terminal whereby the signal from the source 142 is integrated. Also, a switch 162*d* forms input signals selected either by the range switch 181 when the integrator means 18 is operated in the direct mode and alternatively, the switch 162*d* selects an input from the conductor 130. It should be recalled that the conductor 130 provides the range indication from the tape playback means 16. An additional switch element 162*e* is also connected to the conductor 130 to provide inputs at the second and third terminals for purposes to be described.

The switches 162*a* through 162*e*, inclusive, are shown in FIG. 5 as being mechanically connected together and may be operated as a group to the desired position.

Figure 7:
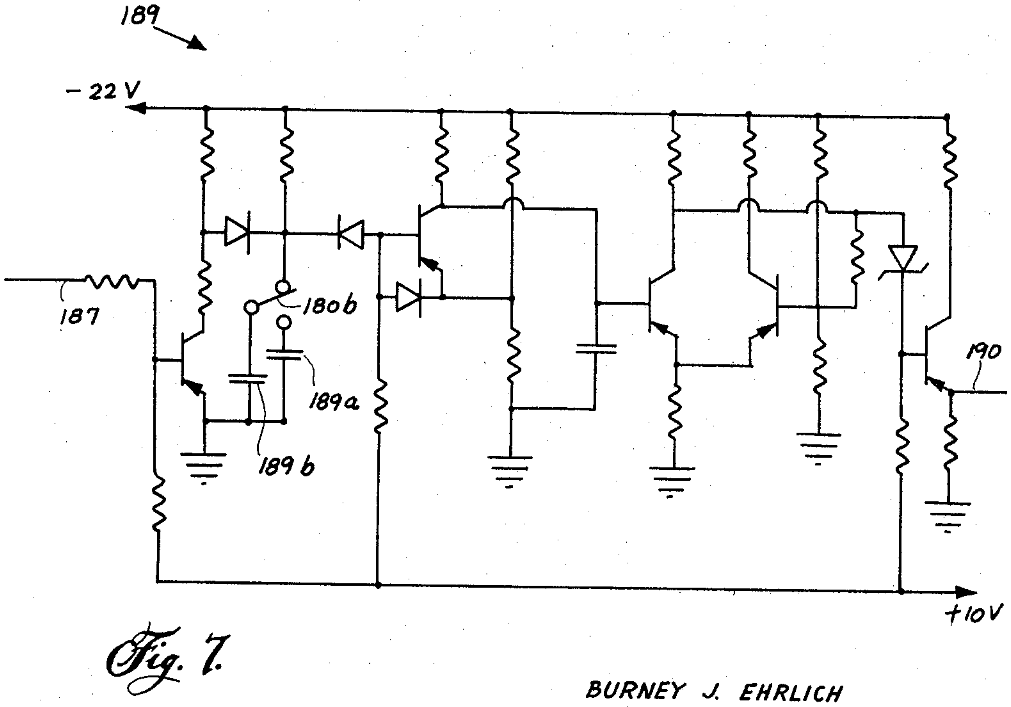
FIG. 7 is a schematic circuit diagram of a timer circuit.

The switch 162*d* inputs the binary one from the conductor 130 which indicates the effect of autoranging and the binary one is inverted by a NOR gate 184. A pair of NOR gates 185 and 186 forms a latch with the inputs being arranged to indicate whether or not the information in the data channel was recorded in the high or low range of operation. The inputs to the gate 185 include the switch 162*c* which connects the low range output signal from the sensor means 164 when the level sensor 164 is energized. Also, gate 185 includes an input from the inverter NOR gate 184. The gate 186 receives an input from the switch 162*e* and also receives the output signal of the level sensor means 164 which indicates operation in the 500 millivolt range. It will be recognized from the foregoing that the NOR gate 186 receives inputs from conductor 130 indicating high range of operation or alternatively from high range operation of the level sensor 164. Conversely, the NOR gate 185 receives indications from both sources indicating operation in the low range. In the low range, a binary zero is input to the NOR gate 184 and inverted to form a binary one. A binary one at the input of the gate 185 requires a binary zero output and the binary zero output of the gate 185 is coupled to the input of the gate 186. Since the other inputs to the gate 186 are also binary zeros, the output level is a binary one. A binary one on the conductor 187 coexists with a complementary binary zero in the conductor 188. The conductor 187 is connected to a delay timer 189 and thereafter forms a binary one in the conductor 190 which is connected to the counterswitch 168. A description of the apparatus of the counterswitch means 168 will be given in greater detail hereinafter. The delay timer 189 includes a pair of capacitors 189*a* and 189*b* which accommodate an adjustment in the time delay of the delay timer 189. Those skilled in the art will appreciate that the time of operation of the delay timer 189 is adjustable, and an exemplary circuit for use in forming a controlled delay is shown in FIG. 7.

Returning to the counterswitch means 168 which is of electronic construction, the pulses from the switch 180*a* are input to a NOR gate 200. The NOR gate includes an additional input in the conductor 201 which input can, for present purposes, be likened unto the output signal of the peak recognition circuit means. That is to say, when there is no peak as detected by the peak recognition means shown in FIG. 4, a binary one signal level is placed on the conductor 201 and requires a constant level of binary zero output from the gate 200. This prevents counting of the decade counter 169*a* which decade counts the units totaled by integration. Also, the conductor 201 is input to a second NOR gate 202 and the imposition of a binary one at its input requires a binary zero output continuously and thereby prevents counting of pulses in the tens decade counter 169*b*. It will be appreciated that all count totals placed in the tens decade 169 must pass through the gate 202. Recalling for the moment that the recording means 12 reduces the gain of the amplifier 22 shown in FIG. 2 by a factor of 10 and that therefore output pulses recorded on the magnetic medium 14 are then representative of increments of integration ten times greater, the electronic switch means operates to direct pulses output by the V-to-F converter 165 to the tens decade 169*b* instead of the units decade 169*a* so that the total represented in the counter 169 represents an accumulation of increments of integration area of equal size or magnitude. To this end, a binary one on the conductor 190 which inputs to the NOR gate 203 requires a binary zero output from said gate which is input to the gate 202. This frees the gate 202 to conduct pulses directly from the V-to-F converter as supplied through the switch 180*a* to the tens decade 169*b*, it being assumed that the signal indicating the occurrence of a peak is represented by a binary zero in the conductor 201. The pulses are also input to the units decade counter 169*a* by the gate 200 but it will be observed that it is impossible for the counter 169*a* to generate a carry pulse which would ordinarily be transferred to the tens decade 169*b*. The carry pulse is generated by taking signals indicating the $\bar{1}$ and the $\bar{8}$ conditions of the counter 169*a* and connecting same through a NOR gate 204 which generates a carry pulse. The carry pulse is then connected through the gate 203 and then to the gate 202 for connection to the tens decade 169*b*. Thus, when the signal on the conductor 130 indicates that the recording means 12 is operating in the low range during recordation of an analytical signal, pulses are input to the units counter 169*a* and carry pulses are generated through operation of the NOR gate 204 and are thereafter transferred to the tens decade 169*b*.

Those skilled in the art will appreciate the generation of a carry pulse by operation of the gate 204 which derive the information from the $\bar{1}$ and $\bar{8}$ signals internally of the decade 169*a*. As has been noted hereinbefore, four bits of information are customarily used in decimal counting which is generally known as binary coded decimal representation.

When a signal is supplied over the conductor 130 indicating that, at the time of recording on the magnetic medium, the recording means 12 was operating in the low or 50 millivolt range, binary zero on the conductor 190 permits formation of a binary one output of the gate 203 which blocks the gate 202 to the transfer of pulses. Binary zero input to the gate 203 is maintained except when a carry pulse is generated by the gate 204 which then permits the gate 202 to pass one pulse to the tens decade 169*b*.

As previously noted, the conductor 188 forms a binary one when the apparatus shifts into the high or 500 millivolt range as dictated by the signal on the conductor 130 and is achieved in the previously described recording means 12 shown in FIG. 2. In such event, binary one is formed of the conductor 188 and is connected to apparatus to be described. For instance, the conductor 188 communicates with a solenoid driver amplifier 208 which drives a relay 209 for purposes of changing the gain of the recorder buffer circuit 166 and the offset of drift control circuit 158. As previously noted, the buffer 166 provides an isolated output which does not reflect the variations of the load connected thereto. By way of example, and not limitation, the amplifier 166 may be switched by including an output stage emitter follower which has a divider resistor network as the emitter resistance. By such means, it will be easily appreciated by those skilled in the art that the relay 209 would select output signals having a relationship of ten to one by choosing various points in the divider resistor network.

The conductor 188 is also connected to a solenoid driver 210. The solenoid driver 210 is connected to a relay 211 and operates same when supplied with the signal. The relay 211 alters the gain of the input amplifier 144 of the integration means 18 in the same manner as the gain of the amplifier 22 above described is altered. However, this alteration in gain may be effected, by way of example and not limitation, by utilizing two feedback networks wherein the amount of feedback is such that the output signal is varied by a factor of ten. In any event, those skilled in the art will appreciate means for altering the gain of the amplifier 144 in response to operation of the relay 211. Implicit in the above is the fact that circuit components 143, 144 and 145 (see FIG. 4) are not used when integrating a tape recorded signal.

A third use of the signal on the conductor 188 which indicates that the apparatus is operating in the high or 500 millivolt range is associated with the peak sensor means as will be described. The conductor 188 is input to a delay timer 212. Delay timer 212 provides an output signal for a driver amplifier 213 which is communicated with a relay 214. The relay 214 cooperates with a resistor to define the clamp means 152 previously noted with respect to FIG. 4 and thereby clamps the output of the peak recognition means during fluctuations introduced by switching the amplification level of the input signal. As will be appreciated, the response time of the differentiating means driving the amplifier 150 is materially altered when the resistor is paralleled across the amplifier 150. In this regard, it should be noted that the resistor is relatively small in value so as to obtain rapid response.

The delay timer 212 which is provided prior to operation of the relay 214 is shown with a pair of capacitors **212*a* and 212*b* which are chosen in response to actuation of a switch 180*c* which is mechanically actuated with previously described switches in response to selection of the playback speed of the tape playback means 16. Attention is directed to FIG. 7 which illustrates the delay timer 189 which can be similar or even identical to the delay timer 212. The exemplary circuitry shown in FIG. 7 accommodates a slight delay affected on switching from one gain level to the other so that the count accumulated in the counter 169** is accurate. Without going into overextended explanation of the circuitry shown in FIG. 7, reference is made to copending application Ser. No. 447,026, filed Apr. 9, 1965, which explains the operation of the circuitry shown in FIG. 7.

Figure 6A:
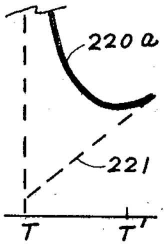
FIG. 6A and 6B are enlarged portions of the waveform shown in FIG. 6.
Figure 6B:
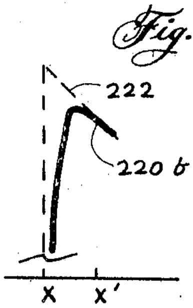

The delay of the circuitry 189 and the circuitry 212 is used to accumulate the proper count total in the counter 169 and the timing is best understood by reference to FIG. 6. FIG. 6 represents the output voltage of either the source amplifier 144 or the reconstructed analog signal on the conductor 95 wherein the central portion of the wave form 220 shown in FIG. 6 is reduced in scale because of the reduction of tenfold in the gain of the amplifier circuitry. On the abscissa of the graph of FIG. 6, the time T represents the actual instant of reducing the gain whereas the time T′ represents an instant occurring thereafter in which the gain falls to some minimum value and is thereafter responsive to variations of the input from the chromatograph or other such source. Likewise, the time X indicates the point as which the gain is increased in one of the amplifiers by a factor of ten and the time X′ represents the point at which the gain achieves some maximum value. The wave form 220 deviates from a possibly perfect theoretical wave form indicated in dotted line in FIG. 6A at 221 in contrast with an expanded view of the portion **220*a* of the actual wave form. It will be appreciated that the incremental area between the curves 220 and 221 represents additional units of integration placed in the counter 169. On the other hand, when the gain of one of the amplifiers is increased by tenfold, the wave form 220 jumps upward rather quickly as best shown in FIG. 6B. The dotted line 222 represents a theoretical wave form whereas the actual signal may increase something on the order of the curve 220*b*. Again, the area between the two curves is representative of a difference of a theoretical value and measured value. So that the present apparatus obtains an accurate account without any deleterious effect from the change in gain in the circuitry supplying the analytical signal for integration, the delay circuits 189 and 212 are utilized as will be described with respect to the wave form 220 in FIG. 6. In FIG. 6, the interval of reduced gain extends from the time T to the time X. This is represented by the arrow at 223. The delay timer 189 operates the counter input switch 168 (see FIG. 5) for the interval of time indicated at 224 in FIG. 6 which interval of time extends from the time T′ to the time X. On the other hand, the timer 212 operates for the interval of time represented at 225 in FIG. 6 which extends from the time T to the time X. The function of the delay is to clamp the peak sensor by operation of the overload protection means 152 (see FIG. 4) wherein the fluctuations in the wave form 220 caused by amplifier switching in gain are not sensed as peaks. Redirecting attention to FIG. 6, it will be appreciated that the wave form occurring at approximately the time T and the wave form occurring approximately at the time X both simulate peaks when in actuality, they are part of the basic peak 220. Because of this, the peak sensor means is clamped for the interval 225** to prevent indicating the bogus peak.

As previously noted, the timer 212 is preferably similar to the timer 189 which is shown in FIG. 7.

Attention is next directed to FIG. 8 which illustrates in detail one embodiment of the control logic 160 shown in FIG. 4. In FIG. 8, input signals are derived from the conductors 103 and 104 from the playback means 16 shown in FIG. 3. These signals, it will be recalled, indicate the occurrence of data as supplied by the conductor 95 (see FIG. 4) to the integrator means 18 or, alternatively, the conductor 104 indicates the occurrence of an identification numeral. Except for the modifications related to the connection of the conductors 103 and 104 to utilize the signal levels thereon in the control logic circuitry 160, the operation of the control logic is best understood and explained in copending patent application Ser. No. 418,064, filed Dec. 14, 1964, bearing the title "Integrating and Recording Circuit for Obtaining a Nonlinear Relationship," now Patent No. 3,412,241, granted Nov. 19, 1968, said patent being assigned to the common assignee of the present invention.

For purposes of identification, it should be noted that the circuitry shown in FIG. 8 includes the Schmitt triggers 154 and 155, details of the peak recognition circuit 156, a peak width timer 230, a plateau timer 231, a level sensor 232, and positive reentry circuit means 233. In addition, the logic control means in FIG. 8 includes a number of NOR gates indicated at 240 to 267, a pair of switches 270 and 271, diodes 275 through 282, and capacitors 284 through 287. In addition, the circuitry shown in FIG. 8 includes conductors 167, 201, 103 and 104 which have been previously described as conductive means for transferring pulses from the V-to-F converter to the counter 169, means for operating the counterswitch 168, means for indicating playback of actual data from the magnetic medium 14, and means for indicating the transfer of an identification numeral from the magnetic medium, respectively. Additionally, the circuitry shown in FIG. 8 includes conductors 290 through 305, inclusive, which have functions as will be indicated hereinafter. The function of the signals or levels transferred over the conductor 290–305, inclusive, will be stated after a greater understanding is obtained of the circuitry shown in FIG. 9.

Considering FIG. 9, the schematic illustrates circuitry considered typical to the present invention wherein data is accumulated and transferred to the printer. In addition, the circuitry includes the scanning means 176 to better relate the operation of the scanning means to the various operations entailed in transferring data from the data counter 169 to the printer 19.

A typical decade comprising the data counter 169 is indicated in FIG. 9. The decade is provided with input pulses on the conductor connected to the bistable circuit element 169–1 and includes additional bistable counting elements 169–2, 169–4, and 169–8. As will be recognized by those skilled in the art, the decade includes devices for storing the value of four bits and the bistable circuit elements are interconnected by way of the NOR gate 169–9 which alters the counting of the four bit counter from a maximum possible sixteen states to ten to conform to the decimal number system. It is believed that further elaboration on this is not necessary since those skilled in the art are familiar with this type apparatus. The typical decade of the counter 169 is provided with input pulses from a decade of a less significant value which are input to the circuit element 169–1 to form carry pulses which are transferred to the next preceding decade, and so on. Also, the decade includes connections to a data reset conductor, as will be described in greater detail hereinafter.

Typical means for storing in the memory 171 is illustrated in FIG. 9 and includes four bistable devices indicated at 171–1, 171–2, 171–4, and 171–8. The memory 171 is permanently connected to the counter 169 which makes available pulses at every operation of the counter. Since it is not necessary to receive all the intermediate counts achieved in the counter 169 but rather it is preferred to receive only the final count, a plurality of inhibit gates 171–5 is connected between the decade counter 169 and the memory means 171. An input inhibit conductor is provided for enabling transfer of data from the decade 169 to the memory means 171.

Just as the inputting of information to the memory 171 is controlled by inhibit means, the output from the memory means is also controlled by similar inhibit means indicated at 171–9. Now, it will be appreciated that there might be as many as six or nine decades of memory in the counter 169 and there should be a corresponding number of memory means in the memory 171. The output of any number of memory means 171 arranged in decade format and extending to any number of decades such as six or more, is connected with the decimal conversion means 172. However, it should be recognized that the decimal conversion means is operated by the scanner means 176 so that only one decimal conversion means is found useful and is shown in FIG. 9 whereas such means may actually operate with any desired number of memory means arranged in decade format. That is to say, FIG. 9 is typical in that it shows one decade of memory means 171 whereas any number of memory means in decade format may be connected to the decimal conversion means 172. The input of the signal from each of the memory means 171 is to a plurality of gates indicated at 172–1 and so on so that the signals indicating the condition of the four bits in the decimal digit and the inverse signals thereof are generated by the plurality of NOR gates. The output of the plurality of NOR gates (being eight in number) is interconnected in a wiring matrix to provide inputs for a number of NOR gates 172–5. These NOR gates are arranged to decode the binary signals output by the gates connected to the wiring matrix 172–6. Decimal conversion is arranged by taking proper outputs from the matrix 172–6 so that the gates 172–5 form outputs in decimal relationship to one another whereby counting may be achieved and whereby conversion from the binary coded decimal format to decimal number representation is achieved.

The output of the decimal conversion means 172 is connected to solenoid driver means 175. The solenoid driver includes driver amplifiers **175*a* and solenoids 175*s* which are represented in FIG. 9 electrically as load devices of the amplifiers 175*a*.**

At this juncture, it is of benefit to note that the printer 19 (see FIG. 4) is preferably a ten key printer on which the solenoids **175*s*** are positioned above the ten keys representing the digits zero through nine. The most significant digit is entered first and the other digits are entered thereafter in order of descending significance when the solenoids are operated to punch the keys and make entries therein. As will be described hereinafter, entry of the information is made complete by operating the enter or add key on conclusion of the transfer from memory of all the information associated with an analytical integration.

The scanner means 176 is indicated also in FIG. 9. Basically, the means includes a multivibrator source 176–1, a decade counter 176–2, and a binary coded decimal to decimal conversion circuit means 176–3. The means 176–2 and 176–3 may be patterned after the decade 169 and the decimal conversion means 172 shown in greater detail in FIG. 9. The decimal converter means 176–3 is provided with ten outputs and it will be appreciated that sequential stepping of an enable signal from one output to the next output is available for scanning the several decades of memory which are represented by the typical decade 171 shown in FIG. 9. Connection of the scanner 176 to the memory 171 is by a plurality of NOR gates 176–4 having inputs of each of the steps or states of scanner means 176. The gates 176–4 invert the scan enable signals and output same to a plurality of OR gates 176–5 which then communicates with the memory means 171. If it is found that six decades of memory are needed in the integration means 18, then it will be appreciated that only six of the ten or more steps provided by scanner means 176 are nevessary. On the other hand, it is possible to use all of the steps if so desired. In any event, the outputs of the scanner means 176 are sequentially connected to the decades in the memory means 171 in order of significance from the most significant information to the least significant information. It should be noted that the gates 176–4 and 176–5 are represented generically and are connected to all of the outputs of the scanner means 176 except that one of the outputs is chosen for use with the identification numeral transferred from the tape playback means 16. As will be explained in greater detail hereinafter, it is sufficient for the present purposes to note that the six output terminal is chosen in the preferred embodiment and the gate 176–5 connected thereto is provided with a different input as compared with the generically represented gate 176–5.

The last state of the scanner means 176 is provided with a conductor connected to a plurality of gates 176–6, 176–7, and 176–8. The output of the gate 176–6 serves as a print command for the printer 19 and is communicated with an OR gate 310. The OR gate drives a driver amplifier 311 which operates a solenoid 312 positioned above the total or add key on the printer 19. In addition, FIG. 9 illustrates a switch 313 which is so mounted on the printer 19 as to indicate the actual operation of the printer to enter the data onto the paper tape such as the paper tape 20 shown in FIG. 1. The switch 313 is connected to a binary one source and comunicates with a capacitor 314 and thereafter with a grounded diode 315 for forming an input signal for a latch circuit including gates 316 and 317. One input to the gate 317 is derived from the NOR gate 318 and the output of the gate 318 is also connected to a NOR gate 319. Operation of these gates will become more readily apparent hereinafter.

As noted before, conductors 290–305, inclusive, are used in the circuitry shown in FIGS. 8 and 9. Below is included a tabulation or list of the conductors which gives the mnemonic function of the conductors. The conductor 290 connects to the reset line and supplies the reset level to the NOR gate 318 shown in FIG. 9. The conductor 291 which is output by the gate 242 shown in FIG. 8 is the latched signal indicating the inverse of identification. The conductor 292 is the inverse of the signal on the conductor 291. Both conductors 291 and 292 are input to the gates 176–5 shown in FIG. 9 and the conductor 292 also connected to the gate 318. The conductor 293 shown in FIG. 8 is connected to the peak number counter 177 shown in FIG. 4 which peak number counter is a decade device very similar to the decade shown typically in FIG. 9 and which can be used to encode or enumerate the peaks as they transpire in the analytical wave form. Thus, it will be appreciated that the conductor 293 is connected to a typical decade and the data is retrieved from the decade in the same manner as previously described for the operation of the circuitry shown in FIG. 9. The signal on the conductor 294 is generated when the scanner 176 dwells at its zero or quiescent state and is connected from the zero output terminal thereof and forms an input for the control logic 160 shown in FIG. 8. The signal on the conductor 295 is generated by the multivibrator 176–1 in the scanner 176 and is also input to the control logic. The signal on conductor 296 results from the end of the scanning cycle of the scanning means 176 and is generated by operation of the number of gates shown therein on reaching the nine state in the scanner means 176–3. The signal on conductor 296 is also input to the logic control means 160. The signal on conductor 297 is generated by the switch 313 which indicates that the printer is actually entering the data as shown in FIG. 9. The signal on conductor 298 is derived from any one of the midpoints of the decade conversion means 176–3 to simply indicate that the scanner has passed through some midpoint of its cycle. As shown in the drawings, conductor 298 is connected to the 4 output of the scanner. However, it may be connected to any one of the other intermediate points for providing a signal to the control logic 160. The control logic generates a signal on the conductor 299 which resets the data counter 169.

The control logic generates a signal on the conductor 300 which inhibits the input of information to the memory means 176 from the decade counter means 169. The signal on the conductor 301 is generated by the control logic to initiate operation of the scanner and is applied to the multivibrator for enabling same. The signals on the conductors 302, 303, 304, and 305, represent the occurrence of a peak, negative slope, positive slope, and not positive slope, respectively, as output by the Schmitt triggers 154 and 155 and as interpreted by the peak recognition circuit means 156.

Operation of the control logic shown in FIG. 8 and the data handling means shown in FIG. 9 will be given by way of example for a single peak which is presumed to have sequentially positive slope, zero slope, and negative slope, wherein the peak is surrounded by a base line signal of essentially no slope and a very low amplitude. Such a description will assume an initial reset condition in the apparatus shown in FIG. 8. Reset of the control logic is obtained by operating the reset switch 270 which places a binary one on the conductor 290. As will be recalled, binary one is a negative signal whereas binary zero approximates zero potential. The conductor 290 which supplies the binary one to a number of gates requires the output of a binary zero of the gates 244, 247, 255, 260, 262, 265, and 258. On the other hand, reset condition includes binary one at the output of gates of gates 251, 254, 257, 259, and 261. It should be recalled that the conductor 305 is connected to the opposite side of the Schmitt trigger comprising the circuit means 154 so the absence of slope at a base line condition places a binary one on the conductor 305 and thereby requires binary zero output from the gate 253. When the binary one is taken off the reset line 290, the gates 262 and 263 reverse their conditions, and input a binary one to the gate 264. A binary zero is formed in the conductor 299 which resets the data counter 169. Of course, the conductor 299 is connected to all of the decades comprising the data counter 169. This is desirable since it places the counter 169 at a zero total count and thereby in condition to count pulses on occurrence of an analytical fluctuation.

The onset of a peak is denoted by positive slope. This forms a binary one in the conductors 302 and 304 while placing a zero on the conductor 305. The output of the NOR gate 251 becomes zero which is supplied by the conductor 201 to data counter switch means 168 shown in greater detail in FIG. 5. This enables the admission of data to the counter 169. Also, the gates 252, 253, and 255 are reversed in output conditions on peak onset.

It was assumed that the peak will pass through a point of maximum amplitude wherein the peak has a value of zero slope. This alters the signal in the conductor 305 to form a binary one which momentarily charges the condenser 234 in providing a signal to the gate 252. The change of signal at the gate 252 is dependent on the charging interval of the capacitor 234.

The wave form, after passing through its maximum value, will then have negative slope as the value decreases towards a base line value of approximately zero potential. At the conclusion of a peak, when the instantaneous value returns to the base line, the signal output by the peak recognition means 156 in the conductor 302 is removed and becomes a logical zero. Termination of a signal indicating the occurrence of a peak generates a logical one at the conductor 201 which is communicated with the previously noted counterswitch 168 to thereby inhibit the inputting of data. This is logical since the pulses occurring after the termination of a peak are those occasional pulses associated with the base line value and they have no information useful in chromatographic analysis or the like. Also, termination of the peak reverses the serially connected gates 251, 252, 256, and 261. Zero output from the gate 261 is conducted by the wire 300 to the plurality of gates 171–5 shown in FIG. 9 to terminate the inhibition of the gates to accept and transfer logical signals from the data counter 169. It was previously noted that the memory is inhibited while the counter 169 is accumulating a total since interim counts are of no consequence. The reversal of the condition of the gate 256 causes the gate 257 to form a zero on the conductor 293 which connects to the peak number counter 177 (see FIG. 4) and which signal represents one cycle causing the counter to advance and to further identify or indicate the peak in such a numerical fashion.

The termination of a peak initiates the transfer of data by the circuitry shown in FIG. 9. Termination of the peak forms a binary zero on the conductor 301 which initiates operation of the multivibrator 176–1 shown in FIG. 9. The output of the gate 261 becomes a binary zero which is input to the gates 171–5 (see FIG. 5) which then connects the memory means 171 to the counter means 169 and the memory means assumes the state of the counter. The connection is maintained for a short interval of time to allow the memory means 171 to settle on the values imposed from the counter 169. However, the signal is shortened because of the operation of the gates 259, 260, and 256, which provide an input to the gate 261 terminating the signal on the conductor 300 and restoring the binary one to the conductor 300. Then, the memory is effectively disconnected from the counter to permit the accumulation of integral totals in the counter immediately thereafter, even though the information from the peak remains in the memory and even though it may remain there for some interval of time while being transferred to the printer 19. This permits the apparatus to handle two consecutive peaks very close together without confusing the data of the two.

The changes referred to above on the conductor 300 are coupled through the capacitor 285 and eventually form a relatively short pulse on the conductor 299 which resets the counter. All decades of the counter 169 are reset by the signal on the conductor 299 to place same in condition for further counting as noted hereinabove.

As noted above, the multivibrator 176–1 was initiated in operation and results in sequential output signals from the scanner means 176. The outputs of the scanner means 176 are all communicated to the NOR gates typified at 176–4 for purposes of inversion and are supplied to the output inhibit gates 171–9 connected at the output of the memory means 171. Normally, it is desirable to inhibit the transfer of information from the decades in the memory 171 which is achieved by applying a binary one to all of the decades. Obviously, a binanry one at all the NOR gates 171–9 requires a zero output therefrom. Scanning is affected by sequentially placing a binary zero on the conductor communicating with the output inhibit gates 171–9 and such is accomplished sequentially beginning with the most significant digit. Since the scanner in its quiescent state dwells at the zero terminal, the first step in the scanning operation places a one on the one terminal and also places a zero on the zero terminal which is coupled by the conductor 294 to the gate 249 shown in FIG. 8. This signal in cooperation with the signal on the conductor 295 communicating from the multivibrator and providing an out of phase signal form an output at gate 250 and the level is input to the gate 255. This results in the application of a binary one to the gate 256 which places a zero output on that gate which remains until the onset of another peak.

At midcycle, signals are formed on the conductor 298 which is communicated with the gate 258. This signal operates in the latched circuitry as shown in FIG. 8. Then, on reaching the last terminal of the scanner (the 9 output), the binary one of the scanner forms a pulse on the conductor 296 which is input to the gate 310. The gate 310, which is an OR gate, causes entry of the data by the printer 19 which is placed on the paper tape 20. During said operation, the switch 313 is actuated to form a signal on the conductor 297 connected to the gates 176–6, 176–7, and 176–8 to terminate the print command on the conductor 296. Also, entry of the information signifies that it is no longer necessary to maintain the data in the memory means 171 and to this end, the conductor 297 is applied to the bistable storage devices in the memory 171 for resetting same.

The scanner continues to operate until it returns to the zero output. This places a binary one on the conductor 294. The conductor 294 is input to the gates 259 and 260 in a manner such that the signal on the conductor 301 is terminated which stops operation of the multivibrator 176–1 and thereby terminates the operation of the scanner 176.

While FIG. 8 includes the peak width timer, the plateau timer, the level sensor and a positive reentry means, a description of the operation of these circuits is found in the above-referred-to application bearing Ser. No. 418,-064, now Patent No. 3,412,241.

As was noted above, the foregoing description of operation assumes the input of a peak from a conventional source without the utilization of the tape recording and playback means of the present invention. However, such description of operation is useful in that the operation is not materially changed except as hereinbelow noted when the tape recording and playback means of the present invention is used. Thus, attention is directed to the conductors 103 and 104 which provide inputs for the control logic 160 shown in FIG. 8. Recalling again the structure of the playback means shown in FIG. 3, on the recording of a symmetrical wave form indicating the transfer of data such as the wave form 30′ shown in FIG. 2A, binary one is formed on the conductor 104 after a delay determined by the timer 106, shown in FIG. 3. During the transfer of data, the gate 240 and the gate 241 both output binary zeros to the control logic 160. It will be appreciated that when data is not being transferred on the conductor 104, the gate 240 forms a reset pulse for the conductor 290. Thus, it can be seen that the control logic is automatically reset when there is no data being reconstructed in the playback means 16 and output on the conductor 95 for integration by the V-to-F converter means previously described. Also, during the transfer of data as output by the playback means 16, a binary zero is input to the gate 251 which has no effect on its operation, it being recalled that the conductor 302 supplies a signal indicating a peak as detected by the peak recognition circuit 156 shown in FIG. 8.

On the other hand, when no data is transferred through the conductor 95 and the playback means 16 outputs a signal indicating first reset and then the formation of an identification numeral (see the wave forms of FIG. 2A), a binary one is imposed on the conductor 290 to reset the apparatus. A binary one from conductor 103 is imposed at the input of the gate 251 to simulate a peak signal as applied by the peak recognition circuitry means 156 to conductor 302 and the gate 251. An identification numeral is treated as a peak and an integral of the area under the wave form is taken although it will be recognized that the wave form is a relatively constant level signal, having been determined by the voltage level at the selector switch 32 shown in FIG. 2. The time duration of the identification signal is controlled by the delay timer 48 shown in FIG. 2. With these facts in mind, attention is redirected to the conductor 103 which inputs the identification signal to the latched gates 242 and 243. When the identification signal starts, the signal level on the conductor 103 is connected to the gate 251 to simulate a peak in derogation of operation of the peak recognition circuit means 156. This operates the control logic 160 shown in FIG. 8 in the same manner as a peak signal. This initiates the inputting of data to the counter 169 because the V-to-F converter 165 (see FIG. 4) which forms the pulses for the counter 169 encodes the signal in pulse form without regard to the shape of the wave form. Thus, the pulses are input to the counter and such integration continues for a controlled interval of time. It is possible to calculate the voltage of the voltage divider 33 shown in FIG. 2 so that the operation of the identification number switch 32 to any terminal such as the fifth terminal will cause integration (it being recalled that the interval of time is fixed) whereby a four digit number is accumulated in the counter means 169 and wherein the most significant digit is a five. On the other hand, any other point in the voltage divider 33 can be selected and the most significant digit will correspond to the selected point. This results from integrating an approximately rectangular wave form of controlled height and time duration.

While the circuitry shown in FIG. 8 is operated by the level on the conductor 103 input to the gate 251, the circuitry shown in FIG. 9 utilizes the output of the latched gates 242 and 243 as a means to control the printing of the identification numeral. The scanner is initiated since the control logic 160 treats the identification wave form as any other peak. A binary one is maintained on the conductor 291 during scanning and is connected through the OR gate 176–5 to the memory means 171. It should be recalled that information having four digits is stored in the counter wherein the most significant digit is the identification digit. The conductor 291 is connected to all of the conductors communicated from the scanner means 176 to the memory means 171 and maintains a one at the plurality of gates 171–9 to prevent the transfer of the bits describing the digits stored in the decade 169 into the decimal conversion means 172. Thus, the signal on the conductor 291 suppresses the readout of all data; however, this is not true for the most significant digit in memory which is the identification number desired.

The conductor 292 from the latched identification gates is input to the gate 176–5 communicating with the decade of memory storing the most significant digit. A binary zero on this gate coinciding with arrival of the scanner means 176 to the six terminal (chosen in the preferred embodiment as shown in FIG. 9) places a zero on the conductor which zero is communicated with the gates 171–9 associated with the six decade or the fourth most significant decade in the counter and the apparatus is permitted to transfer the data from the memory means 171 into the decimal conversion means 172. This effects the transfer of a single identification digit selected originally during recording.

This digit is entered in the printer 19 by operation of the solenoids 175 in the above-described manner. When the scanner arrives at the last or the ninth terminal, a print command is generated in the conductor 296 causing entry of the identification number.

An explanation of the entry of information and totaling of previously entered data relates to operation of the add key. Reference is made to the exemplary wave form 10' shown in FIG. 1 which has a number of peaks. The present invention obtains an integral of the area underneath each of the peaks separately and enters same on the paper tape 20 resulting from operation of the adding machine 19. At the termination of a run of data, it is desired to total the area of all the peaks which is meaningful in obtaining the percentage relationship of each of the peaks to the whole. This is useful in determining the quantity of a chemical in chromatographic analysis by way of example. The use of the recording and playback means of the present invention entails the generation of a reset signal (see FIG. 2A) before and after the run of data. Thus, on the conclusion of analysis and integration of the wave form 10' shown in FIG. 1 and the entry of decimal measures of the area of various wave form peaks upon the printed tape 20, then the reset pulse will operate the printer 19 to effect an addition of the data. The reset signal placed on the magnetic medium 14 after recording the entirety of the chromatographic analysis on the magnetic medium forms a binary one or a reset pulse on the conductor 290 shown in FIG. 8. The reset pulse is input to the gate 318 shown in FIG. 9. When the reset pulse appears on conductor 290 at the gate 318, the binary one forms a zero output which is input to the gate 319. Previous operation of the switch 313 to form a binary one coupled through the capacitor 314 initially sets the output of the latched gate 317 at a binary one. After operation of the switch 314 dependent on the charging rate of the capacitor and other design factors, the voltage at the input of the gate 316 comes up to a binary zero, changing the output of gate 317 to input an additional zero to the gate 319 and zero inputs will form an output of a binary one. This output is passed through the OR gate 310 and operates the total solenoid on the printer 19. Thus, it will be recognized by those skilled in the art that the first operation of the solenoid 312 effects the last entry of a chromatographic analysis and additional actuation of the printer without the entry of data causes same to take a total of the numbers previously entered therein and the total is printed on the tape 20. It will be appreciated that prior operation of the entry key of the printer is necessary to enable same to achieve a total. The prior operation can immediately precede the entry of the total or it can occur sometime before, as might occur when the wave form 10' shown in FIG. 1 includes a base line value at the end of the analysis which separates the last data entry in time from operating the total key.

The identification digit is not entered until after entry of the total since the total entry is effected on the termination of data by recording the reset wave form (FIG. 2A).

Attention is redirected to FIG. 5 which illustrates the speed switches **180*a*, 180*b* and 180*c* when selecting the speed of playback. The possibility of proportionality error on playback is avoided by connection of the flip flops 165*a* and 165*b*** to output pulses on the higher speed at an increased rate, or four times faster.

The present invention is particularly useful in integrating to obtain the area under a peak wave form. As previously noted, the invention accommodates recording and playback errors such as wow or flutter in the tape decks or the like in the utilization of a data channel and a reference channel in the magnetic medium 14. It should be recalled that the two channels feed a differential amplifier which obtains a difference between the two so that the momentary variations in tape speed which time modulate the recorded signals are reduced in the reconstructed signal and the reconstructed signal is quite accurate. In the use of the reconstructed signal for integration purposes, it should be noted that the errors in amplitude are reduced by the utilization of the reference signal at the differential amplifier but such errors do affect the time duration of peak amplitudes. For instance, assume that the playback means 16 plays the magnetic medium 14 at an accelerated speed approximately one percent faster than true speed. This introduces an error which is reduced with respect to the amplitude. When the amplitude of the signal and reference are approximately equal, the changes of the signal are cancelled by equal changes in offset to provide a relatively noise-free, signal on playback. Very accurate integration is achieved because errors affecting signal amplitudes also inversely affect the time duration of such signals. That is to say, a one percent error for a nonbase line signal results in an increased amplitude for the signal but will also shorten the timed extent of the signal. Since integration is the measure of the area of these parameters, the increase of one and simultaneous decrease of the other to the same extent practically eliminates error in the area obtained by integration. Thus, it is found that the errors are not deleterious in larger signals to obtain true integrals whereas the error is used in the offset supplied to the original signal to be recorded at approximate base line values to obtain a true and accurate base line and to enable accurate detection of peak onset and termination without ambiguity.

It should be noted that the signal range of the source such as the chromatograph can vary as much as eighty or one hundred db and that the present invention is adapted to record the signal by pulse density modulation of the magnetic medium. Magnetic mediums are limited to thirty or perhaps forty db dynamic range and are simply unable to accept the data except as presented by the present invention. It should be further noted that the invention reduces modulation effects resulting from less than perfect playback and recording apparatus most particularly at base line values when such modulation effects have a large percentage deviation and can contribute a good deal of error. On the other hand, errors in larger signals are averaged out so that the integral provided by the integrating means 18 is quite accurate.

Broadly, the present invention relates to means for recording and transferring analytical signals.

What is claimed is:

1. Recording apparatus for recording an analytical measurement signal having recurrent data fluctuations which extend in a unidirectional manner from a base line level comprising:

circuit means for supplying the analytical measurement signal;

circuit means for supplying a constant amplitude direct-current offset signal;

voltage-to-frequency converter means responsive to both the analytical measurement signal and the direct-current offset signal for producing a pulsating data signal having a repetition rate which is proportional to the sum of the amplitudes of these two signals;

means for generating a pulsating reference signal having a constant repetition rate;

and magnetic recording means for simultaneously recording the pulsating data signal and the pulsating reference signal in parallel tracks on a magnetic recording medium.

2. Apparatus in accordance with claim 1 and further including means for modifying the wave form of one of the pulsating data and reference signals for enabling such signal to have two different wave forms, one signifying the recordal of data and the other signifying the nonrecordal of data.

3. The apparatus of claim 1 and further including means for forming an identification signal and recording same on the magnetic recording medium.

4. The apparatus of claim 1 and further including first and second amplifier means coupled to the output of the voltage-to-frequency converter means and the reference signal generating means, respectively, for amplifying the pulsating data signal and the pulsating reference signal to a level sufficient to saturate the magnetic recording medium during the occurrence of the pulsations therein.

5. The apparatus of claim 1 and further including:
- an adjustable gain amplifier means coupled intermediate the circuit means for supplying the analytical measurement signal and the voltage-to-frequency converter means and having at least two different gain conditions for adjusting the amplification of the analytical signal;
- level sensor means responsive to the analytical signal for controlling the adjustable gain amplifier means to provide a higher amplification factor for smaller signal amplitudes and a lower amplification factor for larger signal amplitudes;
- and means for recording on the magnetic recording medium an indication of the gain setting at which the amplifier means is operating.

6. The apparatus of claim 1 and further including:
- magnetic playback means for simultaneously reproducing at separate terminals the recorded data signal and the recorded reference signal;
- and circuit means responsive to the reproduced data and reference signals for reproducing the analytical signal with a minimum of base line error.

7. Playback apparatus for use with a magnetic recording medium having recorded in parallel tracks thereon a pulsating data signal and a pulsating reference signal, the pulsating data signal having a repetition rate proportional to the sum of the amplitudes of an analytical signal and a direct-current offset signal, comprising:
- magnetic playback means for simultaneously reproducing at separate terminals the recorded pulsating data signal and the recorded pulsating reference signal;
- first frequency-to-voltage- converter means for converting the reproduced pulsating data signal into a reconstructed analytical signal corresponding to the original analytical signal;
- second frequency-to-voltage converter means for converting the reproduced pulsating reference signal into a direct-current signal;
- and circuit means for combining the direct-current signal with the reconstructed analytical signal for minimizing base line errors in the reconstructed analytical signal.

8. The apparatus of claim 7 wherein the circuit means for combining signals is a differential amplifier for subtracting the direct-current signal from the reconstructed analytical signal.

9. The apparatus of claim 7 wherein the pulsating data and reference signals are recorded on the magnetic recording medium at a predetermined recording speed and wherein the magnetic playback means is operated at a rate of speed greater than the predetermined recording speed and wherein the first and second frequency-to-voltage converter means are altered in operating range to output signals to the combining circuit means wherein the signal therefrom is shortened in time duration and increased in signal level in relation to the shortened time duration in a recreated signal having area between the recreated signal and a fixed level related to the area between the analytical signal and a fixed level.

10. The apparatus of claim 7 wherein the analytical signal from which is derived the recorded pulsating data signal is amplified by adjustable gain amplifier means prior to its conversion to a pulsating data signal and wherein there is recorded on the magnetic recording medium a signal parameter indicating the gain setting of the amplifier means and wherein the playback apparatus further includes circuit means responsive to the signal parameter representing the gain setting for providing indications of the gain setting of the amplifier means.

11. The apparatus of claim 10 wherein the signal parameter indicating the gain setting is the recorded wave form of the pulsating reference signal and wherein the playback circuit means which provides the indications of the gain setting detects the character of the pulsating reference signal wave form for providing indications of the gain of the amplifier means simultaneously with playback of the recorded pulsating data signal.

12. Apparatus for use with an analytical signal having recurrent data fluctuations which extend in a unidirectional manner from a base line level comprising:
- voltage-to-frequency converter means for converting the analytical signal into a pulsating data signal having a repetition rate which is proportional to the amplitude of the analytical signal;
- means for generating a pulsating reference signal having a constant repetition rate;
- magnetic recording means for simultaneously recording the pulsating data signal and the pulsating reference signal in parallel tracks on a magnetic recording medium;
- magnetic playback means for simultaneously reproducing at separate terminals the recorded data signal and the recorded reference signal;
- circuit means responsive to the reproduced data and reference signals for reproducing the analytical signal with a minimum of base line error;
- and integrator means responsive to the reproduced analytical signal for determining the areas of the data fluctuations in such signal.

13. The apparatus of claim 12 and further including:
- means for adding a direct-curent offset signal to the analytical signal supplied to the voltage-to-frequency converter;
- means for altering the wave form of the pulsating data signal before it is recorded for providing an indication of the recordal of no analytical signal;
- detecting means coupled to the magnetic playback means and responsive to the reproduced pulsating data signal for detecting the alteration of the wave form thereof;
- and means operated by this detecting means for interrupting operation of the integrator means for relating the integration of signal areas to the playback of the analytical signal.

14. The apparatus of claim 12 and further including:
- means coupled to the voltage-to-frequency converter means for recording a second pulsating data signal representing selected fixed information in place of the pulsating data signal representing an analytical signal;
- detecting means for detecting the occurrence of the second pulsating data signal on playback by the magnetic playback means;
- output means coupled to the integrator means for expressing the areas of the data fluctuations in the analytical signal in units of measure;
- means operated by the detecting means for interrupting operation of the integrator means on detecting the second pulsating data signal;
- and means for obtaining the selected fixed information on playback and in communication with the output means for expressing such information in a manner distinguished from the areas of the data fluctuations in the analytical signal.

15. The apparatus of claim 12 wherein the pulsating data signal and pulsating reference signal are normally provided with symmetrical wave forms and wherein such apparatus further includes:
- circuit means for selectably modifying at least one of the pulsating data signal and pulsating reference signal to provide an asymmetrical wave form for same prior to recording on the magnetic recording medium;

circuit means coupled to the magnetic playback means for detecting the occurrence of an asymmetrical wave form for producing a control signal indicating such occurrence;

and circuit means for supplying the control signal to the integrator means for controlling the operation thereof.

16. The apparatus of claim 12 and further including:

adjustable gain amplifier means for amplifying the analytical signal before it is supplied to the voltage-to-frequency converter means;

circuit means for reducing the gain of the amplifier means on increase of the analytical signal to a predetermined level;

means operated by change of gain of the amplifier means for indicating the occurrence thereof by changing the wave form of the pulsating reference signal recorded on the magnetic recording medium;

counter means having first and second inputs and being incorporated in the integrator means for determining the areas of the data fluctuations in the analytical signal;

circuit means incorporated in the integrator means and responsive to the reproduced analytical signal for supplying pulses to the counter means at the first input thereof for enabling the counter means to total the areas of the individual fluctuations in the analytical signal;

and circuit means coupled to the magnetic playback means for detecting changes in the wave form of the reproduced pulsating reference signal for switching the counter means to total the pulses through the second input thereof; the first and second inputs of the counter means having a relationship inversely of the gain reduction of the amplifier means to accumulate equal units of area in the counter means.

17. The apparatus of claim 12 and further including:

adjustable gain amplifier means having at least two gain conditions differing by a factor of ten for amplifying the analytical signal before it is supplied to the voltage-to-frequency converter means;

level sensor means operable by a predetermined level of analytical signal to operate the amplifier means at reduced gain;

control means incorporated with the magnetic playback means for indicating to the integrating means when the output signal formed by the playback means indicates operation of the amplifier means at reduced gain;

counter means incorporated in the integrator means for representing the areas of the data fluctuations in the analytical signal by units of area numerically accumulated therein;

a pair of inputs to the counter means differing by a factor of ten, such inputs being coupled to the playback means for accumulating the output signal in the counter means;

and the control means being coupled to the integrator means for use of the pair of counter inputs in accordance with the gain of the amplifier means to maintain units of area of constant value in the operation of the counter means.

18. The apparatus of claim 12 wherein the integrator means includes:

voltage-to-frequency converter means for converting the reproduced analytical signal into a train of pulses having a repetition rate which is proportional to the amplitude of such reproduced analytical signal;

and counter means responsive to this train of pulses for producing indications of the areas of the data fluctuations in the reproduced analytical signal.

References Cited

UNITED STATES PATENTS

| | | | |
|---|---|---|---|
| 2,892,022 | 6/1959 | Houghton | 340—174.1 |
| 2,937,366 | 5/1960 | Sims | 340—174.1 |
| 3,041,415 | 6/1962 | Gratian | 179—100.2 |
| 3,158,845 | 11/1964 | Bengston | 340—174.1 |
| 3,181,133 | 4/1965 | Seitner | 179—100.2 |
| 3,217,329 | 11/1965 | Gabor | 340—174.1 |
| 3,243,789 | 3/1966 | Ragle | 340—174.1 |
| 3,337,693 | 8/1967 | Silverstein | 179—100.2 |

BERNARD KONICK, Primary Examiner

VINCENT P. CANNEY, Assistant Examiner

U.S. Cl. X.R.

179—100.2